(12) United States Patent
Fraser

(10) Patent No.: US 7,542,464 B2
(45) Date of Patent: Jun. 2, 2009

(54) SWITCHING NETWORK

(76) Inventor: Alexander G. Fraser, 62 Carriage House Rd., Bernardsville, NJ (US) 07924

( * ) Notice: Subject to any disclaimer, the term of this patent is extended or adjusted under 35 U.S.C. 154(b) by 778 days.

(21) Appl. No.: 10/846,233

(22) Filed: May 14, 2004

(65) Prior Publication Data

US 2004/0240437 A1 Dec. 2, 2004

Related U.S. Application Data

(60) Provisional application No. 60/470,574, filed on May 14, 2003.

(51) Int. Cl.
*H04L 12/50* (2006.01)
*H04Q 11/00* (2006.01)

(52) U.S. Cl. .................... 370/355; 370/380; 370/388

(58) Field of Classification Search ............... 370/355, 370/380, 388
See application file for complete search history.

(56) References Cited

U.S. PATENT DOCUMENTS

| | | | | |
|---|---|---|---|---|
| 4,577,308 A * | 3/1986 | Larson et al. | ........... | 370/212 |
| 4,630,260 A * | 12/1986 | Toy et al. | ........... | 370/355 |
| 4,701,906 A * | 10/1987 | Ransom et al. | ........... | 370/355 |
| 5,276,425 A * | 1/1994 | Swanson et al. | ........... | 340/2.22 |
| 5,309,432 A | 5/1994 | Kanakia | | |
| 5,751,934 A * | 5/1998 | Han et al. | ........... | 714/4 |
| 5,754,120 A * | 5/1998 | Argentati | ........... | 340/2.22 |
| 5,799,015 A * | 8/1998 | Bennett et al. | ........... | 370/388 |
| 5,940,389 A * | 8/1999 | Yang et al. | ........... | 370/380 |
| 6,335,992 B1 * | 1/2002 | Bala et al. | ........... | 385/17 |
| 6,366,716 B1 * | 4/2002 | Graves | ........... | 385/17 |
| 6,452,926 B1 * | 9/2002 | Wiklund | ........... | 370/388 |
| 6,696,917 B1 * | 2/2004 | Heitner et al. | ........... | 340/2.22 |
| 6,795,432 B1 * | 9/2004 | Lee | ........... | 370/388 |
| 6,816,487 B1 * | 11/2004 | Roberts et al. | ........... | 370/388 |
| 7,023,841 B2 * | 4/2006 | Dell et al. | ........... | 370/388 |
| 7,068,653 B2 * | 6/2006 | Lespagnol | ........... | 370/390 |
| 7,130,920 B1 * | 10/2006 | Sailor | ........... | 709/238 |
| 7,161,906 B2 * | 1/2007 | Dell et al. | ........... | 370/231 |
| 7,280,538 B2 * | 10/2007 | Li | ........... | 370/390 |
| 7,301,941 B2 * | 11/2007 | Dally | ........... | 370/374 |
| 2002/0031118 A1 * | 3/2002 | Li et al. | ........... | 370/360 |
| 2002/0159445 A1 * | 10/2002 | Yanagimachi | ........... | 370/355 |
| 2006/0104281 A1 * | 5/2006 | Scarr et al. | ........... | 370/395.1 |
| 2006/0165070 A1 * | 7/2006 | Hall et al. | ........... | 370/369 |

OTHER PUBLICATIONS

Charles Clos, "A Study of Non-Blocking Switching Networks," Bell System Technical Journal, vol. 32, pp. 406-424, 1953.
A. Hopper and D.J. Wheeler "Binary Routing Networks," IEEE Trans. on Computers, vol. C-28, 10 p. 699-703 (Oct. 1979).
V.E. Benes, "Mathematical Theory of Connecting Networks and Telephone Traffic," Academic Press, 1965.
Nick McKeown, "The iSLIP Scheduling Algorithm for Input Queued Switches," IEEE/ACM Transactions on Networking, (Apr. 1999).

(Continued)

*Primary Examiner*—Alpus H Hsu
(74) *Attorney, Agent, or Firm*—Lerner, David, Littenberg, Krumholz & Mentlik, LLP

(57) ABSTRACT

A large high capacity switch is provided for a communication network which is constructed from a network of smaller switches. Data is fragmented into fixed sized cells and the cells of a traffic flow are aggregated by grouping cells to form larger yet uniform units of information transfer. The groups are transmitted synchronously and in parallel to increase the effective bandwidth of information transfer.

29 Claims, 39 Drawing Sheets

OTHER PUBLICATIONS

P. Krishna, N. Patel, A. Charny and R. Simcoe "On the speedup required for work-conserving crossbar switches," IEEE J. Selected Areas of Communications, (Jun. 1999).

C.Minkenberg, R.P.Luijten, F.Abel, W.Denzel and M.Gusat, "Current Issues in Packet Switch Design," Hotenets '02 confproc., Princeton, New Jersey, (Oct. 2002).

Integrated Device Technologies,"IDT 77v400 and IDT 77v500 Switchstar User's Manual," 2975 Stender Way, Santa Clara, CA 95054, Mar. 1999.

Shang-Tse Chuang, Ashish Goel, Nick McKeown and Balaji Prabhakar, "Matching Output Queuing with a Combined Input and Output Queued Switch," Proceedings of Infocom, 1999.

* cited by examiner

MULTIPLEXER STAGES     SWITCH     DEMULTIPLEXER STAGES

MULTIPLEXER STAGES     SWITCH     DEMULTIPLEXER STAGES

MULTIPLEXER STAGES    SWITCH    DEMULTIPLEXER STAGES

MULTIPLEXER STAGES    SWITCH    DEMULTIPLEXER STAGES

MULTIPLEXER STAGES    SWITCH    DEMULTIPLEXER STAGES

MULTIPLEXER STAGES    SWITCH    DEMULTIPLEXER STAGES

MULTIPLEXER STAGES    SWITCH    DEMULTIPLEXER STAGES

MULTIPLEXER STAGES    SWITCH    DEMULTIPLEXER STAGES

MULTIPLEXER STAGES        SWITCH        DEMULTIPLEXER STAGES

MULTIPLEXER STAGES        SWITCH        DEMULTIPLEXER STAGES

MULTIPLEXER STAGES          SWITCH          DEMULTIPLEXER STAGES

MULTIPLEXER STAGES          SWITCH          DEMULTIPLEXER STAGES

MULTIPLEXER STAGES   SWITCH   DEMULTIPLEXER STAGES

MULTIPLEXER STAGES   SWITCH   DEMULTIPLEXER STAGES

MULTIPLEXER STAGES     SWITCH     DEMULTIPLEXER STAGES

MULTIPLEXER STAGES     SWITCH     DEMULTIPLEXER STAGES

MULTIPLEXER STAGES     SWITCH     DEMULTIPLEXER STAGES

MULTIPLEXER STAGES     SWITCH     DEMULTIPLEXER STAGES

MULTIPLEXER STAGES    SWITCH    DEMULTIPLEXER STAGES

MULTIPLEXER STAGES    SWITCH    DEMULTIPLEXER STAGES

MULTIPLEXER STAGES   SWITCH   DEMULTIPLEXER STAGES

MULTIPLEXER STAGES   SWITCH   DEMULTIPLEXER STAGES

MULTIPLEXER STAGES　　SWITCH　　DEMULTIPLEXER STAGES

MULTIPLEXER STAGES　　SWITCH　　DEMULTIPLEXER STAGES

MULTIPLEXER STAGES        SWITCH         DEMULTIPLEXER STAGES

MULTIPLEXER STAGES        SWITCH         DEMULTIPLEXER STAGES

MULTIPLEXER STAGES    SWITCH    DEMULTIPLEXER STAGES

MULTIPLEXER STAGES    SWITCH    DEMULTIPLEXER STAGES

MULTIPLEXER STAGES  SWITCH  DEMULTIPLEXER STAGES

MULTIPLEXER STAGES  SWITCH  DEMULTIPLEXER STAGES

MULTIPLEXER STAGES    SWITCH    DEMULTIPLEXER STAGES

MULTIPLEXER STAGES    SWITCH    DEMULTIPLEXER STAGES

MULTIPLEXER STAGES     SWITCH     DEMULTIPLEXER STAGES

MULTIPLEXER STAGES     SWITCH     DEMULTIPLEXER STAGES

MULTIPLEXER STAGES       SWITCH       DEMULTIPLEXER STAGES

MULTIPLEXER STAGES       SWITCH       DEMULTIPLEXER STAGES

MULTIPLEXER STAGES        SWITCH        DEMULTIPLEXER STAGES

MULTIPLEXER STAGES        SWITCH        DEMULTIPLEXER STAGES

MULTIPLEXER STAGES   SWITCH   DEMULTIPLEXER STAGES

MULTIPLEXER STAGES   SWITCH   DEMULTIPLEXER STAGES

MULTIPLEXER STAGES     SWITCH     DEMULTIPLEXER STAGES

MULTIPLEXER STAGES     SWITCH     DEMULTIPLEXER STAGES

MULTIPLEXER STAGES    SWITCH    DEMULTIPLEXER STAGES

MULTIPLEXER STAGES    SWITCH    DEMULTIPLEXER STAGES

MULTIPLEXER STAGES　　SWITCH　　DEMULTIPLEXER STAGES

MULTIPLEXER STAGES　　SWITCH　　DEMULTIPLEXER STAGES

MULTIPLEXER STAGES    SWITCH    DEMULTIPLEXER STAGES

MULTIPLEXER STAGES    SWITCH    DEMULTIPLEXER STAGES

SWITCHING NETWORK

RELATED APPLICATIONS

The present application claims the benefit of U.S. Provisional Patent Application No. 60/470,574 filed May 14, 2003, the disclosure of which is hereby incorporated by reference.

BACKGROUND OF THE INVENTION

Large scale networks require switches that can handle traffic from many customers. Telephony was an early example.

C. Clos showed that a switching machine which routes traffic between thousands of telephone lines can be constructed by assembling a network of small switches. Clos used analog switch nodes constructed from relays. For more information, see Charles Clos, "A Study of Non-Blocking Switching Networks", Bell System Technical Journal, Vol. 32, pages 406-424, 1953.

With the advent of computer communication, D. Wheeler and A. Hopper described how a large packet switch might be constructed from a network of digital switch nodes with embedded memory. For more information, see A. Hopper and D. J. Wheeler "Binary Routing Networks" IEEE Trans. on Computers, Vol C-28,10 p 699-703 (October 1979).

Memory is required to hold packets which find their way blocked by another packet that is using the same path in the network. It was soon found that some traffic patterns generate "hot spots" in the network—places where a high concentration of traffic leads to delay and/or cell loss. This problem can be eased by enlarging the network so that it offers a choice of paths between ingress and egress ports, then by adding a degree of randomness to the way that traffic is routed, hot spots are dispersed. However, random routing can cause cells to be delivered out of sequence. It also helps to operate the network at a speed that is higher than the combined speed of the switch ingress ports, but power consumption and mechanical design are problematic for large switches.

In the years to come broadband packet switched communication will likely be made available to homes and businesses throughout the United States. Transmission rates available to ordinary consumers are likely to be at least 100 Mb/sec. In order to deliver this service on a massive scale it may be necessary to create a new national communications infrastructure. Economy and large scale will dictate high performance regional networks each serving perhaps one million homes and a fiber-optic backbone network that connects to the regional networks through high capacity packet switches. Accordingly, there is a need for a packet switch that can operate with sufficient speed and on such a scale.

Additional information may be found at: V. E. Benes, "Mathematical Theory of Connecting Networks and Telephone Traffic", Academic Press, 1965; Nick Mckeown, "The iSLIP Scheduling Algorithm for Input Queued Switches", IEEE/ACM Transactions on Networking, (April 1999); P. Krishna, N. Patel, A. Charny and R. Simcoe "On the speedup required for work-conserving crossbar switches", IEEE J. Selected Areas of Communications, (June 1999); C. Minkenberg, R. P. Luijten, F. Abel, W. Denzel and M. Gusat, "Current Issues in Packet Switch Design", Hotenets '02 conf.proc., Princeton, N.J., (October 2002); Hemant R. Kanakia, "High-Speed Packet Switch", U.S. Pat. No. 5,309,432, May 1994; "IDT 77v400 and IDT77v500 SWITCHStAR User's Manual" Integrated Device Technologies, 2975 Stender Way, Santa Clara, Calif. 95054, March 1999, and; Shang-Tse Chuang, Ashish Goel, Nick McKeown and Balaji Prabhakar, "Matching Output Queuing with a Combined Input and Output Queued Switch", Proceedings of Infocom, 1999.

SUMMARY OF THE INVENTION

The present invention is intended to address the foregoing needs.

One aspect of the system relates to a system comprising a plurality of nodes, each node comprising a plurality of input and output ports for accepting and transmitting values, respectively, and a switch for selecting an output port to output a value received on an input port. It also includes a plurality of ingress nodes wherein their input ports are ingress ports of the system and egress nodes wherein their output ports are egress ports of the system and a plurality of node connections wherein a connection connects the output port of one node with the input port of another node. The system further includes sets of nodes, wherein the number of nodes in a set increases with the set's distance from the closest input node or output node. Input stage sets are such that a set which is closer to an ingress node than to an egress node is an input stage set, and output stage sets are such that a set which is closer to an egress node than to an ingress node is an output stage set. Each of the nodes of an input stage set is configured to transmit information during a clock cycle such that the information is intended for the same output stage set.

Preferably, the nodes of an input stage set transmit information intended for the same output stage set having the same number of nodes as the input stage set. Moreover, the center set may be substantially equidistant from the ingress and egress nodes, wherein each of the nodes of the center stage set transmits information intended for the same output stage set. The nodes of an input stage set may also transmit information intended for the same output stage set substantially simultaneously and all of the nodes may share a common clock cycle. A characteristic of the system may also be that wherein output stage sets do not receive information intended for other output sets of the same size.

The size of a set may increase exponentially with distance from the closest input or output node. In addition, the size of a set may increase exponentially based on the number of inputs to the node and the distance from the closest input or output node.

It is also preferable for a node of an input stage set to queue information received on the input ports until all of the nodes of the set store information intended for the same output stage set.

The system may further include stages such that each node is in a stage, wherein the closest distance between the nodes of a stage and the ingress ports is different for each stage. The number of nodes in each stage is the same or the number of nodes in some stages may be larger than the number of nodes in other stages. At least one set may contain at least three nodes.

The nodes of the system may be packet switches, and the system may be a high capacity switch for broadband transmissions.

Another aspect of the present invention comprises a method of routing cells through a network of nodes, each node comprising a plurality of input and output ports and a switch for selecting an output port to output a value received on an input port, the network having ingress and egress ports and a plurality of node connections wherein a connection connects the output port of one node with the input port of another node. Such a method includes: grouping cells according to input/output port pairing such that there are as many cells in a group as there are independent paths between a given ingress/egress port pair; during a single clock cycle, sending each cell of a group on a different one of alternative independent paths; and determining which cells to forward at each stage along the alternative paths so that cells of the group propagate through the network at the same rate; whereby the cells of a group arrive at the output stage during the same clock cycle and are transmitted through the egress port in proper sequence.

Preferably, the cells of the foregoing method are the same size, and each cell defines the egress path through which the cell is to be transferred.

Yet another aspect of the present invention comprises a method of routing cells of information through a switch comprised of stages of interconnected nodes. The method comprises: receiving cells at ingress ports to the switch, the cells having egress ports as a destination; transmitting the cells towards the center stage of the switch in groups, whereby groups of cells transmitted from a set of nodes in stage i are grouped based upon cells which have a particular set of nodes in stage 2k−i as a common intermediate destination within the switch; and transmitting the cells out of egress ports.

Methods of the present invention may also defer transmission of cells out of a set until all of the nodes of the set have cells having the same particular set of nodes as a common intermediate destination.

The groups may also be disassembled after the cells pass the center stage. Each stage after the center stage may further disassemble the groups and each cell of a group may comprise information unrelated to another cell of the group.

Yet still another aspect of the present invention comprises a method of transmitting information along a nodal network. The method includes: transmitting information cells grouped according to burst size to a set of nodes according to a multiplexed scheme; demultiplexing the information cells grouped according to burst size in connection with the information cells being transmitted from a set of central nodes; and delaying transmitting information cells in connection with the arrival of information at a transmitting node so as constitute a group of cells at least equal in size to the burst size. Such a network may be a Clos network. Preferably, each set of nodes comprises, up until a set of central nodes in the network, a number of nodes equal to a multiple of node inputs.

A further aspect of the invention comprises a method of transporting cells of information of fixed size through a multistage Clos network. The method comprises: forming groups of cells at a node in any stage of the Clos network except the last stage, each group of size s, and transmitting the group members through s output ports of the node during a single clock cycle.

In such a method, it is desirable for a plurality of the nodes of the network to form groups of cells, and for the cells of a group to have the same destination. The destination may be a node in the Clos network or an egress port of the Clos network.

The method may also include holding the cells in a queue until a s number of cells are assembled to create a group. The members of a group may also be transferred from one stage of the Clos network to the next substantially simultaneously.

In one regard, all members of a group may pass through a single node in the Clos network such that method also includes reassembling the group at the single node. The group may be reassembled with cells of the group placed in the original sequence.

Such a method preferably includes, when a plurality of cells of a group arrive at a node, enqueuing the cells based on the destination of the cell. The sequence of the cells' ingress into the network is preserved when the cells are enqueued.

The destination may be another node in the Clos network or an egress port of the Clos network.

Yet a further aspect of the invention relates to a cell switching system which includes a first stage comprising m n-to-one multiplexers that transmit information to a second stage. Each multiplexer is configured so as to form groups of cells of size n and transmit group members substantially simultaneously. The second stage comprise a set of n m-by-m switches that feed into a third stage. The third stage comprises m one-to-n demultiplexers. In accordance with the system, one cell goes to each switch of the second stage and all members of a group are destined for one of the demultiplexers in the third stage.

The foregoing system may also have the characteristic wherein the second stage of the cell system is, itself, a switching system as described above. For example, the second stage may include: its own first stage comprising m n-to-one multiplexers that transmit information to a second stage, each multiplexer of the second first stage configured so as to form groups of cells of size n and transmit group members substantially simultaneously; its own second stage comprising a set of n m-by-m switches that feed into a third stage, and; its own third stage comprising m one-to-n demultiplexers. The second stage's own second stage, in turn, may again and in recursive fashion, be yet another three-stage system having stages meeting the foregoing criteria. On the other hand, the second stages of such systems may comprise a set of n individual switch nodes.

Such a system preferably further includes a network of nodes wherein all n cells of a group entering the second second stage are handled identically by the nodes such that the group of cells emerge from the second second stage at the same time and arrive simultaneously at the same third stage demultiplexer. Moreover, all of the cells within a group formed by a multiplexer in the first stage may arrive simultaneously at a destination demultiplexer of the third stage.

The system desirably is also such that the demultiplexers enqueue the cells of an incoming group so as to preserve the sequential order in which the cells were input into the multiplexer that formed the group.

The cell switching system may also comprise a switch having N ingress ports and N egress ports where N is the product of n and m; the N ingress ports correspond to the n input ports on the m multiplexers of the first stage, and; the N egress ports correspond to the n output ports of the m demultiplexers of the third stage. In this regard, the cells may include a header representing the intended egress port of the cell in addition to the other information they are carrying. The cells preferably arrive at the egress port in the same sequence in which they arrived at the ingress port.

Still another aspect of the present invention comprises a switching system, where the system includes: a plurality of ingress ports through which packets enter the system, a plurality of egress ports through which packets leave the system, and a plurality of stages each of which comprises a set of switches. In such a system, each set comprises a plurality of input ports for accepting packets and a plurality of output ports for transmitting packets. A plurality of the sets are configured so as to form groups of packets, each group containing s packets, and so as to transmit group members through s ports of the node during a single clock cycle. Preferably, the different nodes have different values for s. The nodes of the same stage may also have the same value for s.

DETAILED DESCRIPTION OF THE INVENTION

One aspect of the invention relates to the construction of a large switch that is implemented as a network of small switches or "nodes". In this regard, and in many aspects, the switch may be considered a network of nodes. Such switches preferably contain one or more of the following features. The switch accepts traffic in the form of cells, all of which have the same fixed size. Each cell has a payload and a header. Cells enter the network through N ingress ports and leave through N egress ports. Each cell is forwarded through the switching network in accordance with a path address and priority level contained within the cell header. The path address identifies the egress port through which the cell will leave the switch. Each of the nodes is a (micro-electronic) switch having n "input ports" and n "output ports". The relative size of a node and the switch in which it is buried is described by the relationship $N=n^k$ where k is a design parameter of the architecture.

The section entitled "Network Topology" describes some possible patterns of node-to-node connections in accordance with the invention. The section entitled "Cell Grouping" explains some ways in which groups of cells may be assembled and subsequently dismantled in accordance with the invention. There are then four sections which describe how cells may be moved through the switch in accordance with some aspects of the invention, a process which is called "Cell Forwarding." Then follows a section entitled "Node Architecture" which describes just some of the possible structures and internal workings of a node. The final two sections are concerned with node actions that it is preferable to tightly coordinate, such that traffic flow is also controlled.

Introduction of FIGS. 1-6

FIGS. 1-4 illustrate interconnection patterns for relatively small switching networks. Ingress and egress ports are represented by the left-most and right-most arrows, nodes are represented by circles and node-to-node connections are represented by straight lines and/or arrows between the nodes. For the purposes of ease of explanation and when the context so indicates: "N" is used to represent the number of ingress ports to the switching network; "n" is used to represent the number of inputs to each node; "k" is used to represent the stage number of the center stage of the switching network; "s" represents the number of nodes in a set.

Figure 1A:
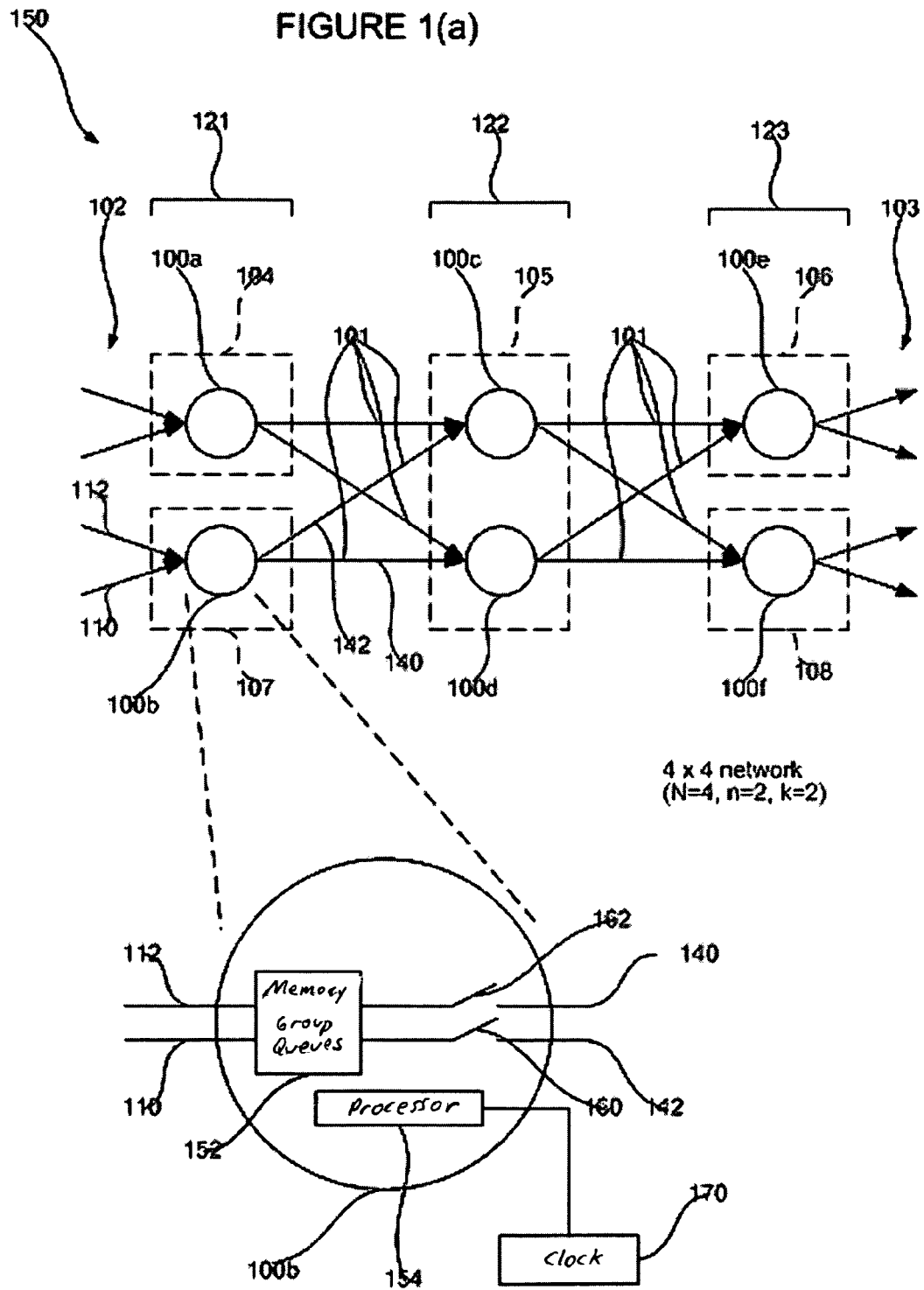
FIG. 1(a) illustrates a 4×4 (4-input, 4-output) three-stage switching network in accordance with an aspect of the present invention.

FIG. 1(a) shows a 4×4 switching network 150 with six nodes 100 interconnected by eight paths or connections 101. Each node has two input ports such as ports 112 and 110, and two output ports such as ports 140 and 142. The nodes are organized in three stages of switching 121, 122 and 123. The distance between two nodes may be considered the shortest number of connections between them; for example, the distance between node 100a and 100f is 2 (one connection to get to either node 100c or 10d, and another connection to get to 100f). In this regard, node 100a is closer to node 100d than node 100f. Four input ports 102 feed traffic into the switching network through the two nodes 100a and 100b in the first stage 121. There are four egress ports 103 which carry traffic away from the two nodes 100e and 100f in the third stage 123. The stage number (k) of the center stage 122 of this switch is 2.

Each node preferably includes a memory 152 for storing the values received on the input ports. The memory further preferably stores queues for groups of cells, which is discussed further below. The node is further capable of routing the input values to one or both, but not necessarily both, of the outputs, such as by the use of switches 160, 162 which may be physical or logical switches. The memory 152 preferably allows the values to be output, as determined by the processor, for a variable duration of time after the values were input into the node 100b. The switches 160, 162 and memory 152 may be controlled by processor 154 or other control circuitry. The memory is desirably tens of megabytes for high capacity switching networks. The node itself is preferably a low-power high performance switch.

The processor is also preferably in communication with a clock 170, which may be, but is not necessarily, located externally to the node. The clock pulse is preferably shared by some (such as the other nodes in the same stage) or all of the other nodes. The nodes transfer information during the clock cycles such that when the nodes of a collection transfer information during the same clock cycle, it should be understood that that those nodes will transfer the information at some point within a duration of time which does not overlap into the next clock cycle. Therefore, information transmitted during the same clock cycle occurs substantially simultaneously as far as the network is concerned.

Each one of the nodes is associated with a set of nodes. For example, node 100a is in set 104, node 100b is in set 107, nodes 100c and 100d are in set 105, node 100e is in set 106 and node 100f is in set 108.

Figure 1B:
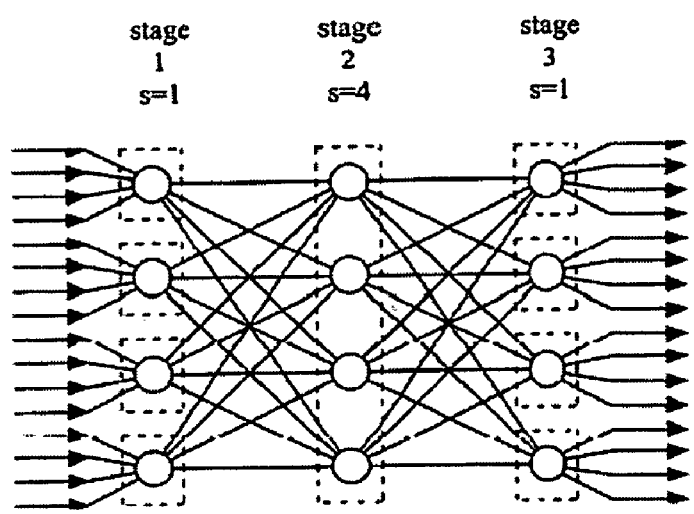
FIG. 1(b) illustrates a 16×16 three-stage switching network in accordance with an aspect of the present invention.

FIG. 1(b) shows a 16×16 three-stage network having four input and output ports per node (n=4). The number of ingress and egress ports to the switching network is 16 (N=16). The center stage is located at stage 2 (k=2).

Figure 2:
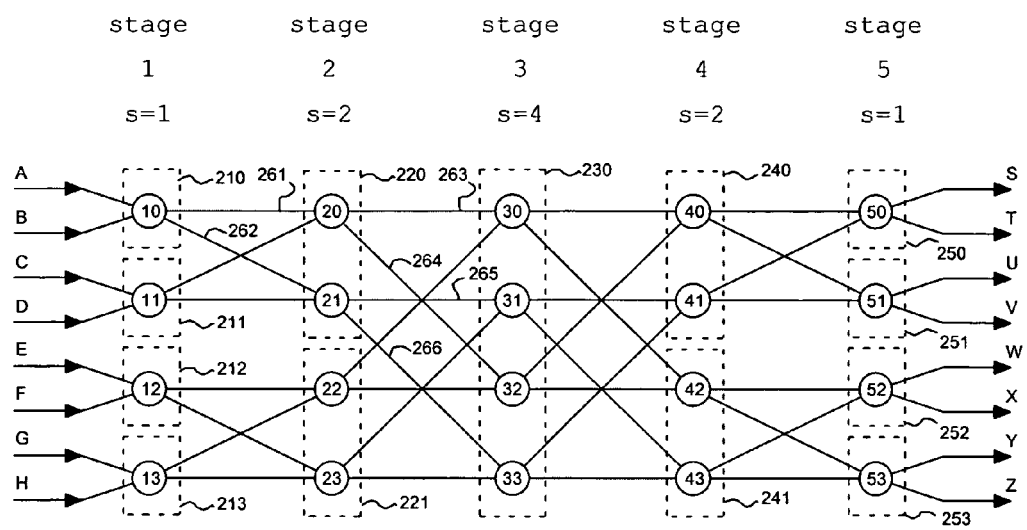
FIG. 2 illustrates an 8×8 five-stage switching network in accordance with an aspect of the present invention.

FIG. 2 shows an 8×8 switching network with five stages of switching. The number of ingress ports (N) is 8, the number of input ports per node (n) is 2, and the stage number for the center stage (k) is 3. In stage 1 the set 210 contains just one node. There are four sets in stage 1, 210-213, and there are four in stage 5, 250-253. Set 220 in stage 2 has size 2, it contains two nodes, and there are two of these sets in stage 2. Set size preferably grows by a factor of n as one moves from stage to stage until the center stage 230 is reached. The right-hand side of this switch is preferably the mirror image of the left-hand side with two sets in stage 4 and four in stage 5.

Figure 3:
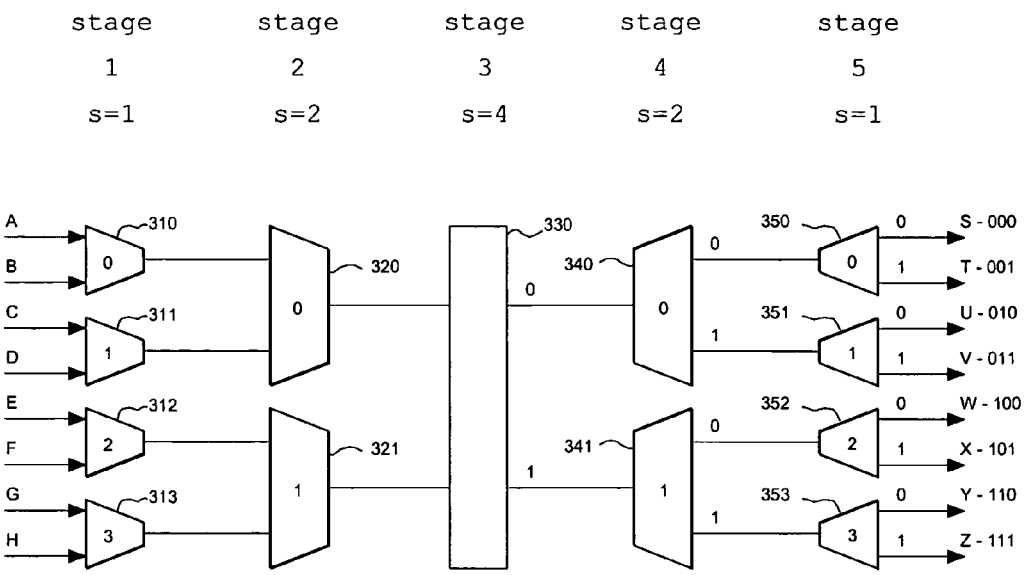
FIG. 3 illustrates an 8×8 five-stage multiplexer network in accordance with an aspect of the present invention.

FIG. 3 presents a functional view of the 8×8 switching network shown in FIG. 2. The four sets in stage 1, 310-313, are represented as multiplexers, each with two inputs and one output. The two sets 320 and 321 of stage 2 are also represented as two-to-one multiplexers. They feed into the two inputs of 2×2 switch 330 that represents the center stage of this switching network. Sets in the output stages 4 and 5 are represented as one-to-two demultiplexers. Demultiplexers 340 and 341 represent sets 240 and 241 in FIG. 2. Demultiplexers 350 through 353 in stage 5 represent sets 250 through 253 in FIG. 2. Switch 330 in stage 3 represents set 230 in stage 3 of FIG. 2.

Figure 4:
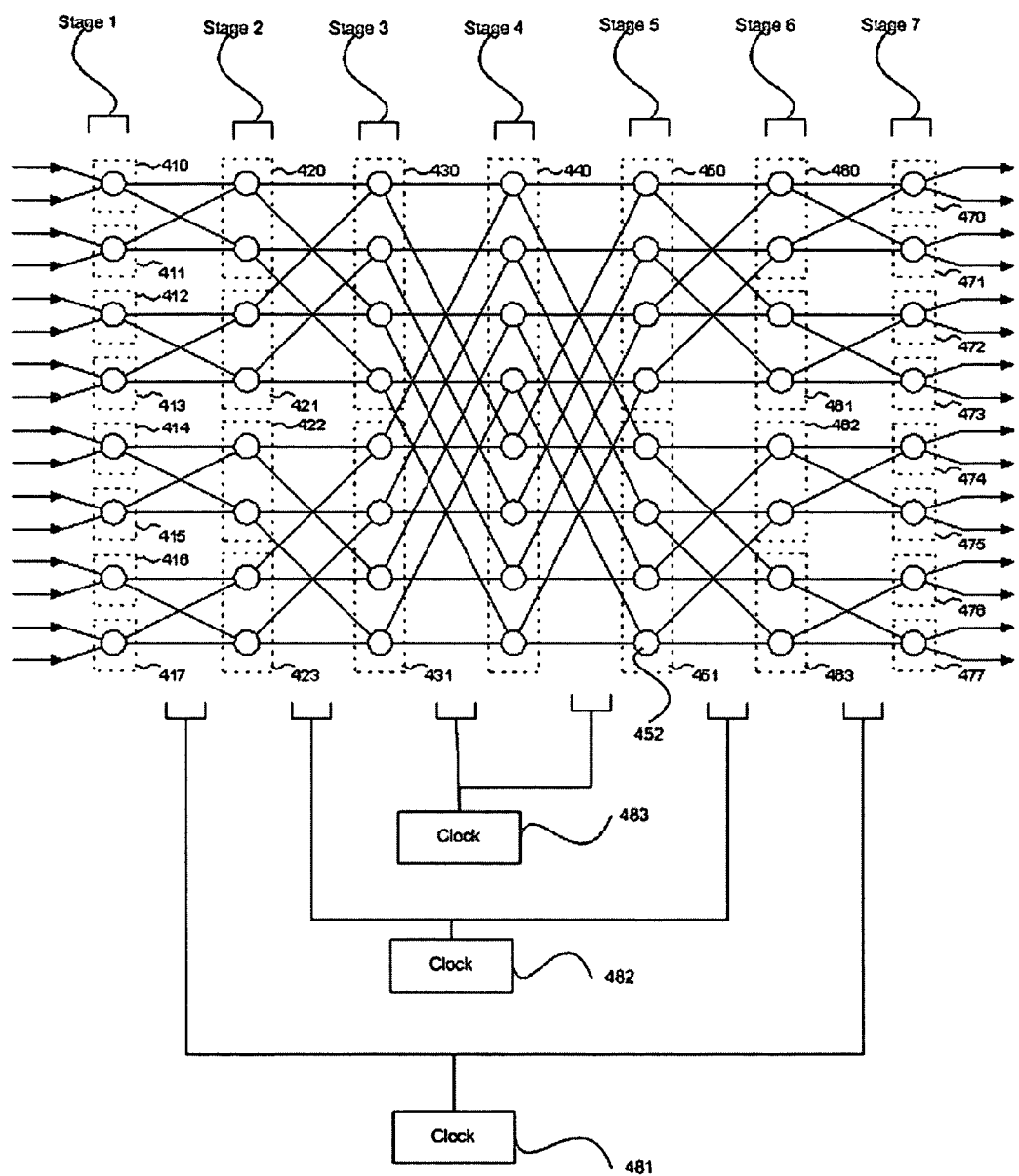
FIG. 4 illustrates a 16×16 seven-stage switching network in accordance with an aspect of the present invention.

FIG. 4 shows a 16×16 switching network with seven stages of switching. The number of input ports per node (n) is 2. Set 410 in stage 1 is capable of generating a group of n cells and transmits the group in parallel through its n output ports to the nodes which are members of set 420 in stage 2. The nodes of set 420 generate a group of $n^2$ cells which it sends to set 430, and set 430 in turn generates a group of $n^3$ cells which it sends to stage 4, 440. Stage 4 switches the incoming groups to its output ports while preserving the group size and then begins the process of dismantling the groups. The size of a group incoming to stage 5 is $n^3$, the size incoming to stage 6 is $n^2$ and the group size entering stage 7 is n.

Figure 5:
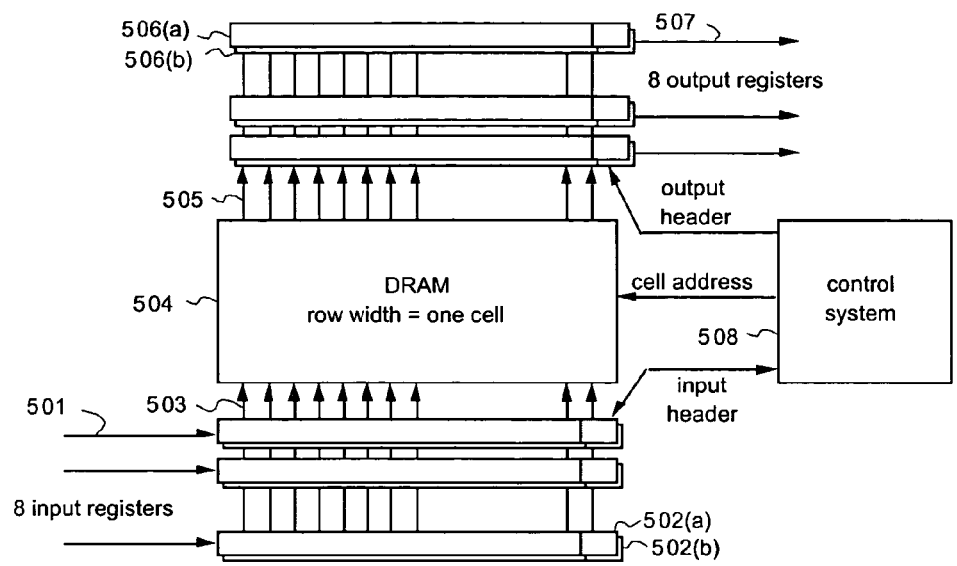
FIG. 5 illustrates an 8×8 switch node that may be used in accordance with an aspect of the present invention.

FIG. 5 shows a potential structure of an 8×8 node (n=8) in accordance with an aspect of the invention. It has 8 input ports 501 that feed into 8 shift register pairs 502, one pair per input port. Each shift register holds one cell. The shift registers connect to a bus 503 that carries cells into a DRAM memory 504. An extension of that bus 505 carries cells from the DRAM to eight output shift register pairs 506, each one of which transmits cells to an output port 507. The control system 508 manages the transfer of cells to and from the memory and controls the formation of cell groups. More information regarding such a node may be found in the following references, both of which are incorporated herein by reference: Hemant R. Kanakia, "High-Speed Packet Switch", U.S. Pat. No. 5,309,432, May 1994, and "IDT 77v400 and IDT77v500 SWITCHStAR User's Manual" Integrated Device Technologies, 2975 Stender Way, Santa Clara, Calif. 95054, March 1999.

Figure 6:
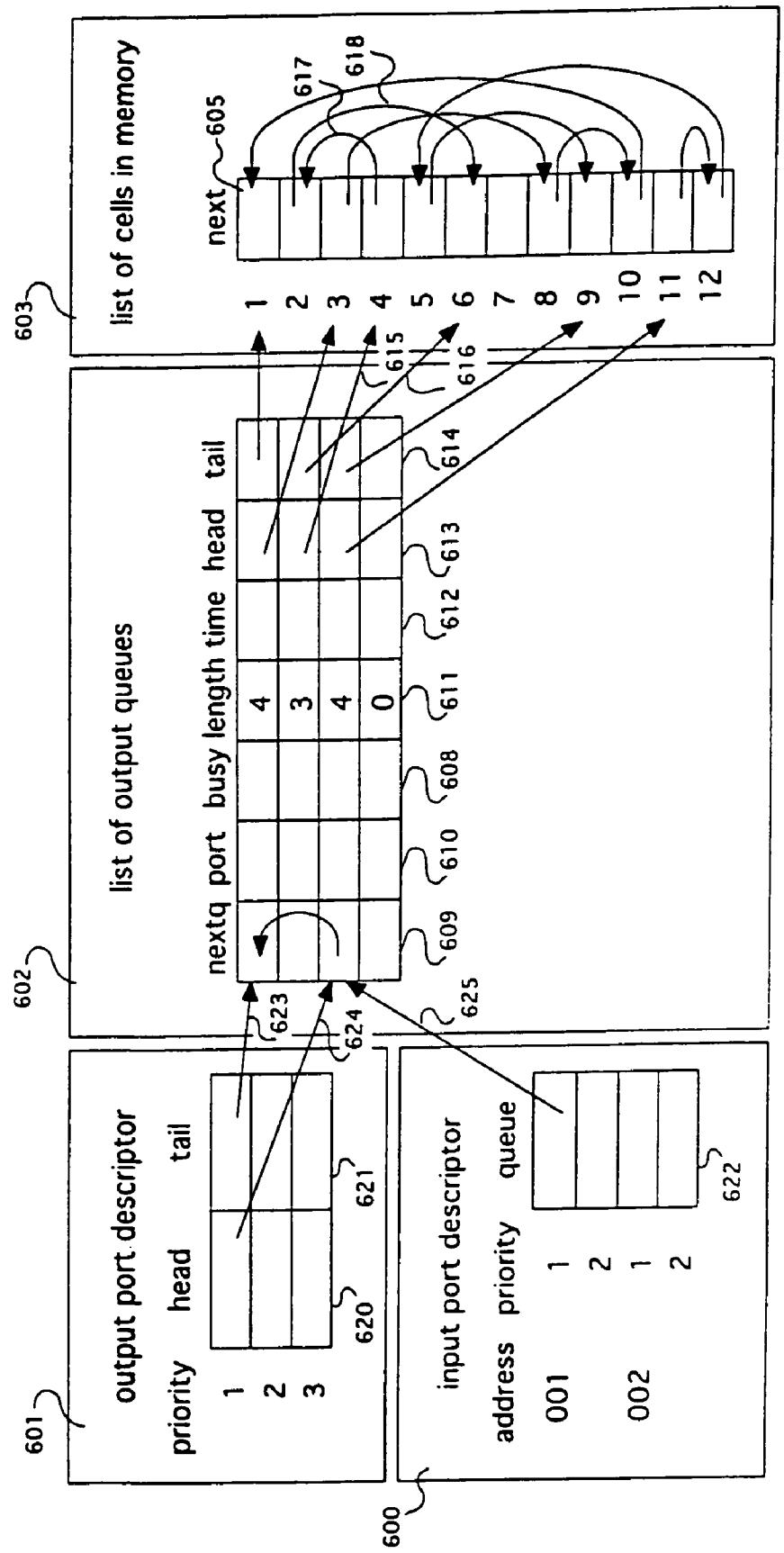
FIG. 6 illustrates data structures, including sample data, of a control system in accordance with the present invention.

FIG. 6 provides data structures that may be maintained by control system 508 in accordance with an aspect of the invention. There are five data structure types. An input port descriptor 600, of which there is preferably one per input port 501, describes the queue to which a cell is to be directed based upon the destination address and a priority level contained in the cell header. An output port descriptor 601, of which there is preferably one per output port 507, describes the queue or queues from which cells are to be transmitted. A list of output queues 602 and a list of cells in memory 603 jointly describe the queues of cells that are held in memory 504 pending transmission through an output port. Alternative data structures are also possible.

Network Topology

Before the data enters the switch, the data is preferably fragmented into fixed size cells, thus making the flow more uniform than it would be if packets retained their varying and unpredictable sizes. Second, the cells of a traffic flow are preferably aggregated by grouping cells to form larger yet uniform units of information transfer. Third, the cell groups so formed are preferably transmitted in parallel so the effective bandwidth of information transfer is increased without resorting to exceptionally fast and expensive technologies.

The switch is preferably a rectangular array of nodes, organized as 2k–1 stages (columns of the array) and $N/n=n^{k-1}$ rows. Stages are numbered 1 through 2k–1. Stages 1 through k–1 are the input stages, stage k is the center stage, and stages k+1 through 2k–1 are the output stages of the switching network. Typically, the input stages will be closer to the ingress ports while the output stages will be closer to the egress ports. The ingress ports are connected to the node input ports in stage 1, and the egress ports are connected to the node output ports in stage 2k–1.

The topology of the switch network is such that the nodes of each stage are logically placed into sets. Each input stage i (for i=1 through k–1) consists of $n^{k-1}$ non-overlapping sets, and each output stage 2k–i also contains $n^{k-1}$ non-overlapping sets. The set size (number of nodes in the set) for input stage i is $n^{i-1}$, and the set size for output stage 2k–i is also $n^{i-1}$. The center stage is a single set of size $n^{k-1}$. Each set in input stage i+1 receives traffic from n sets in stage i, and each set in output stage 2k–i–1 distributes traffic to n sets in stage 2k–i.

For convenience, the nodes in a stage are numbered 0 through $n^{k-1}-1$, and the input and output ports of each node are numbered 0 through n–1. The sets in a stage are sequentially numbered starting at zero for the set that contains node 0. One possible and convenient way to express a path address of an egress port is as a list of the node port numbers that a cell must pass through when it travels from the center stage to the egress port.

In one aspect, the switch topology has three stages (k=2). The first stage is connected to the second by a pattern of transmission paths which connects the n outputs of each stage 1 node to one input in each of the nodes in stage 2. Thus the nodes of stage 1 and 2 are fully interconnected. The same pattern applies for the paths which connect stage 2 with stage 3.

One way of creating a switch topology with five stages to expand upon a 3-stage network (k=2, $N=n^k$ and $n^{k-1}$ nodes in each stage) is as follows.

a) Replicate the network n–1 times so that there are now $n^k$ nodes in each stage.
 b) Separate the left and right sides of the combined network by duplicating the center stage.
 c) Add a new center stage with $n^k$ nodes.
 d) Connect the n inputs of each node in the new center stage to output ports on each of the n replicas of the left-hand side of the original network.
 e) Connect the n outputs of each node in the new center stage to input ports on each of the n replicas of the right-hand side of the original network.

The resulting 5-stage network has $N=n^3$ and k=3. This method of expanding a switching network can be repeated for all integer values of k.

When carrying out steps (d) and (e), it is preferable to preserve a certain parallelism in the path structure which links the center stage, stage k for the new network, with stages k–1 and k+1. For example, let A denote stage k–1, let B denote stage k+1, let C denote the center stage. $A_r$ will denote one of the sets in A, where r=0 for the set that contains node 0 for the stage, and the sets are numbered sequentially with r=n–1 for the last set in the stage. Let $A_{r,q}$ denote a node in set $A_r$, where q=0 for the smallest numbered node in $A_r$ and $q=n^{k-2}-1$ for the last node in $A_r$. Temporarily, divide C into parts that are equal in size to the sets that are found in A and B. Then $C_{r,q}$ denotes a node in C using the same coordinate system as for $A_{r,q}$. The interconnections between A, C and B can be as follows.
  i) Connect output port p in $A_{r,q}$ and input port r in $C_{p,q}$ for all values of r, p and q.
  ii) Connect input port p in $B_{r,q}$ and output port r in $C_{p,q}$ for all values of r, p and q.

Cell Grouping

It is preferable that the cells be grouped as they propagate through the switch network and one manner in which the cells may be grouped is as follows.

Incoming traffic preferably comprises cells having a fixed size. Those cells are then assembled into groups which grow exponentially in size as they move through the input stages of the network. The groups formed within stage i and transmitted to stage i+1 have $n^i$ cells within them. The groups entering the center stage contain $n^{k-1}$ cells. Then, as groups pass through the output stages, group size diminishes exponentially. Groups leaving the center stage contain $n^{k-1}$ cells, and the groups that enter stage $2k-i$ contain $n^i$ cells. The final output stage delivers individual cells through the egress ports.

Cells that are grouped together in stage 1 stay together until stage $2k-1$. The groups formed in stage 1 are composed of cells that are destined for the same set in the final stage of the network. Stage 2 merges groups that were created in stage 1. Stage 2 combines the stage 1 groups even further to make larger groups, where all cells in a larger group are destined for the same set in stage $2k-2$. Preferably, all cells in a group formed in a set in stage i are destined for a single set in stage $2k-i$. Cells in the group travel together until they reach stage $2k-i$ whereupon the group is split into smaller groups that may have different destinations in the subsequent stages of the network. Accordingly, by "traveling together", the cells are transmitted simultaneously from one stage to the next, and all cells of a group visit the same sequence of sets as they travel through the network. Moreover, the cells are transmitted on parallel paths, e.g., stage 220 of FIG. 2 will simultaneously transmit four cells on lines 263-266 to stage 230.

Thus, in accordance with the foregoing grouping aspect, the parallel paths between nodes may be modeled as a single logical path that has higher bandwidth (e.g., four cells on lines 263-266) than a single line (e.g., one cell on line 263). FIG. 3 models FIG. 2 in this regard. Whereas the 8×8 five stage network shown in FIG. 2 consists of 20 identical nodes of equal performance interconnected by 32 paths all operating at the same speed, FIG. 3 models the network as consisting of 6 multiplexers, a single switch and 6 demultiplexers interconnected by 12 paths. The transmission speeds in the center of the network are significantly greater than the transmission speeds at the network's edge. For example, set 220 in FIG. 2 corresponds to multiplexer 320 in FIG. 3. Set 240 in FIG. 2 corresponds to demultiplexer 340 in FIG. 3. The center stage 230 in FIG. 2 corresponds to the N×N switch 330 in FIG. 3. Cells that exit an input set together will simultaneously arrive at the same output set later.

The paths 263, 264, 265 and 266 in FIG. 2 all operate at the same speed, S. With reference to FIG. 3, these paths correspond to a single connection between multiplexers 320, 330 and center stage 330 which operates at speed 4 times S. More generally, connections between stages 1 and 2 in FIG. 3 operate at speed nS, and connections between stages 2 and 3 operate at speed $n^2S$.

As shown in FIG. 3, one aspect of this invention comprises an N×N switching network having an input multiplexer tree, a small central switch, and an output demultiplexer tree. The aggregate rate of input to each multiplexer equals the speed of its single output. Therefore blocking tends not to occur in the input stages of the network. The center stage of the network acts as a single n×n switch that is preferably non-blocking. For each demultiplexer, the aggregate bandwidth of its outputs matches the bandwidth of its input. Therefore, in one aspect of the invention, the demultiplexer will only block if one or more of the switch egress ports is overloaded. Therefore the switching network is generally non-blocking and resists hot-spots when used in the manner described herein.

Input Stage Cell Forwarding

One way in which the nodes may directly or indirectly transmit information to the center stage is as follows.

All node-to-node communication within the switch takes place in accordance with one or more clocks. These clocks are intended to ensure that all cells simultaneously transmitted from one stage of switching arrive simultaneously at the node input ports of the next stage. Alternative clocking arrangements may be used to the same effect. FIG. 4 illustrates a 7 stage switch with three clocks 481, 482 and 483 which are used for node-to-node cell transfers. It will be noted that although the clocks are shown as functionally relating to the connections between the stages, the clocks are preferably in communication with the ports of the nodes. For example, clock 481 provides timing for all node output ports of stage 1 and all node input ports of stage 2. Clock 482 provides timing for all node output ports of stage 2 and all node input ports of stage 3. Clock 483 provides timing for all node output ports of stage 3 and all node input ports of stage 4.

Referring to the four sets 420, 421, 422 and 423 of the second stage in FIG. 4, every one of the nodes in these sets maintains at least four first-in-first-out queues, one each for traffic traveling to the four sets in stage six, namely sets 460, 461, 462 and 463. Stated more generally, it is preferable that every node in input stage i maintains an array of first-in-first-out queues, at least one queue for each of the sets contained in the output stage $2k-i$, k being 4 for the network of FIG. 4.

Preferably, each cell carries with it information which directly or indirectly identifies the switch egress port for which the cell is destined. That information is preferably carried in the cell header. From this information it is possible to identify the sets of the switch output stages through which the cell must pass. One way in which this may be achieved is when the header contains the path address of the egress port. As each cell arrives at a node in input stage 1, that cell is placed at the tail of the queue associated with the identified set in stage $2k-1$ through which the cell must pass.

When a node looks for cells arriving at its input ports, it considers all input ports in the sequence of their port numbers. So, when cells simultaneously arrive on more than one input port, the first to be processed is preferably the cell that arrives at the lowest numbered port.

At each opportunity to transmit, a node considers all queues which have within them at least as many cells as there are output ports on the node, in other words, the queue length is greater or equal to n. One such queue is chosen, or the node passes up the opportunity to transmit (see also the discussion below regarding flow control). The n cells at the head of the chosen queue are transmitted simultaneously through the n node output ports. Cells are transferred to the output ports in the sequence of their port numbers, so the first cell out of the queue goes to port number 0, the first numbered port of n ports which are numbered 0 through n−1.

The several nodes which constitute a set, such as set 421 of FIG. 4, concurrently assemble a group of ns cells where s is the number of nodes in the set, that is, four nodes in the case of set 421. Preferably, all cells of the group are simultaneously transmitted from the set. Therefore the group size is equal to the number of output ports in the set.

Center Stage Cell Forwarding

One way in which the center stage may process information is as follows.

As shown in FIG. 4, the center stage 440 of the switching network may simultaneously receive n groups, each including $n^{k-1}$ cells. Specifically, with reference to FIG. 4, center stage 440 receives 2 groups, each including 8 cells. The cells arrive in synchrony with a clock 483. The groups are distributed across the input ports of the $n^{k-1}$ (8 for the network of FIG. 4) nodes in the center stage. Each node sees one cell from each group.

Preferably, the center stage is not concerned with the formation of groups. Instead, it begins the process of dismantling the groups that were assembled by the input stages. This process is described below for cell forwarding in the output stages.

Output Stage Cell Forwarding

One way in which the nodes may directly or indirectly transmit information from the center stage is as follows.

With reference to FIG. 4, consider node 452 within output stage 5 of FIG. 4. Cells arrive at the node input ports in synchrony with clock 483 which is shared with all input ports on nodes within stage 5. Node 452 maintains an array of first-in-first-out queues, each one associated with a node output and identified by the set to which that output is connected. An incoming cell is placed at the tail of the queue identified with the set through which the cell must next pass.

When node 452 looks for cells arriving at its input ports, it considers all input ports in the sequence of their port numbers. So, when cells simultaneously arrive on more than one input port, the first to be processed is the cell that arrives on input port number 0.

When its transmit clock 482 indicates an opportunity to transmit, node 452 considers each of its output ports in turn. For each output port which has a non-empty queue, node 452 transmits the cell which is at the head of that queue.

Group disassembly is implicit in this process because, as a group travels towards an egress port, the number of available paths to that egress port diminishes. So, fragments of the group come together through the several inputs of a single node. Within that node the cells are preferably placed in a single queue and they emerge through a single node output port. Eventually, what was a group of $n^{k-1}$ cells when it left the center stage of the switch becomes a series of individual cells when they emerge through the egress port.

Examples of Cell Forwarding

An example of the operation of the switch in connection with sample data will now be explored in connection with the 5-stage network shown in FIG. 2. The capital letters A through H on the left of that FIGURE denote traffic producers and the letters S through Z on the right denote traffic consumers. The notation A[1], A[2], A[3] . . . refers to cells transmitted by A, and A[1,2,3] refers to a group comprising these three cells. Three concurrent traffic flows will be discussed: A to X, B to Y and C to Z. The switching network is a synchronous machine and for the purpose of this example of cell forwarding, time is measured in terms of the time that it takes to transmit one cell from one stage to the next. Successive time intervals will be denoted $t_1$, $t_2$ . . . At time $t_0$ there are no cells en route through the network and none stored in the network nodes. It is noted that time for a node may be measured on a different scale, i.e., the node may operate on a different (and preferably faster) clock signal than the switch. For the purpose of this example, it is assumed that there is no propagation delay within the node, i.e., a cell arriving at $t_1$ will exit the node at $t_2$ assuming that other conditions for transmission are met as explained elsewhere.

Consider first a single flow from A to X. A transmits four cells at times $t_1$, $t_3$, $t_5$ and $t_7$. A[1] enters node 10 in set 210 at time $t_1$, where it waits pending the arrival of a second cell to complete a group of n=2 cells. A2 enters node 10 at time $t_3$ where it is immediately combined with A[1] to form a group A[1,2]. At time $t_4$ the group A[1,2] is transmitted by way of paths 261 and 262 to set 220. In this one time interval A[1] is sent to node 20 and A[2] is sent to node 21, both in set 220. Nodes 20 and 21 hold the received cells in a queue pending receipt of additional cells sufficient to complete a group of $n^2=4$ cells. In the absence of any other traffic, set 220 waits until time $t_8$ when A[3,4] arrives, A[3] going to node 20 and A[4] going to node 21. At time $t_9$ nodes 20 and 21 simultaneously transmit A[1,2,3,4] by way of paths 263, 264, 265 and 266 to the center stage 230 where they simultaneously arrive in nodes 30, 31, 32 and 33. In the next clock interval, stage 230 transmits A[1,2,3,4] to set 241 where they arrive at time $t_{10}$. At this point node 42 receives A[1] on input port 0 and A[3] on input port 1. Node 43 receives A[2] on input port 0 and A[4] on input port 1. Both nodes give priority to cells received on the smaller port number. All four cells are next destined for node 52 in set 252. Node 42 transmits A[1] at time $t_{11}$ and A[3] at time $t_{12}$. Meanwhile node 43 transmits A[2] at time $t_{11}$ and A[4] at time $t_{12}$. A[1] arrives at port 0 of node 52 and A[2] arrives at port 1, both at time $t_{11}$. Giving priority to port 0, node 52 transmits A[1] to X at time $t_{12}$ while holding A[2] in queue until $t_{13}$. Meanwhile, at time $t_{12}$, A[3] arrives at node 52 port 0 and A[4] arrives at port 1. Given that A[2] is already in queue, node 52 puts A[3] and then A[4] in queue behind A[2], while it prepares to transmit A[2] at time $t_{13}$. All four cells reach X by the end of $t_{15}$.

Consider next what happens when A repeats its transfer to X while C transmits cells C[1], C[2], C[3] and C[4] to Z in four consecutive time intervals starting at time $t_1$. C[1,2] arrives at set 220 at time $t_3$, C[1] arriving in node 20 and C[2] arriving in node 21. Then A[1,2] arrives there at $t_4$. At this point set 220 can assemble a group of four, C[1,2]+A[1,2], which it sends to stage 230 at time $t_5$. Also in $t_5$ set 220 receives C[3,4] but that must now wait for A[3,4] to arrive before set 220 can complete a second group of four cells. Meanwhile, at time $t_6$ the group C[1,2]+A[1,2] is forwarded to set 241 where it is split. C[1,2] goes to set 253 at time $t_7$ while A[1,2] goes to set 252. At time $t_9$ set 220 sends C[3,4]+A[3,4] to stage 230, and from there at time $t_{10}$ the group goes to set 241. The two messages, four cells each from A and C, are finally delivered to X and Z by the end of time $t_{13}$.

Finally, consider what happens when B, not C, transmits to Z while A again repeats its transmission to X. At time $t_1$ node 10 in set 210 receives A[1] and B[1]. Cells from B enter node 10 in four consecutive time intervals starting at time $t_1$. Node 10 preferably does not immediately combine these with cells from A into a group because groups formed in stage 1 are preferably not dismantled until stage 5. Cells from A and B pass through different sets in stage 5, A goes through set 252 while B goes through set 253. Therefore, A[2] and B[1] wait in node 10 until B[2] and then A[1] arrive there. After that the cells for A and B propagate through the network at the same rate and with the same groupings as previously described for A and C.

Node Architecture

One possible infrastructure, if not operation, of a node may be found in the Kanakia and IDT 77v400 User's Manual discussed above, and is further illustrated in FIG. 5. Note that in FIG. 5, a node is illustrated with 8 inputs (n=8). The primary data path for this node may be embedded in a single chip that contains a DRAM memory 504. The node is designed to switch cells between its input and output ports, 501 and 507. The internal bus, 503 and 505, is preferably of such width that it can be implemented within a chip, but in certain circumstances may contain too many wires to be implemented between one chip and another.

Cells enter the switch through the network input ports 501. As each cell arrives it is stored in an input register 502. Each input register contains two buffers, 502a and 502b, each with capacity for a single cell. While one buffer, 502a say, is receiving a cell, the other buffer, 502b, is waiting to be processed by the node control system 508. When buffer 502a has been filled the two buffers swap roles so that the cell just received is the next to be processed. As each arriving cell is processed it is copied by way of bus 503 to the DRAM memory 504 where the cell joins a queue with other cells traveling towards the same intermediate destination. When the time comes to transmit a cell, the cell is removed from the DRAM memory and is copied by way of bus 505 to one of the output shift registers 506. As with the input registers, each output register contains two buffers, 506a and 506b, each with capacity for a single cell. While one buffer is transmitting a cell through output port 507 the other is waiting to be filled from the DRAM memory.

One possible data structure in accordance with an aspect of the invention is illustrated in FIG. 6. The control system of the sample node of FIG. 5 preferably performs at least two functions: (a) to decide for each incoming cell which output port 507 the cell should leave through, and (b) to hold cells in queues, implemented within the DRAM memory 504, until such time that there is an opportunity to transmit them through the designated output port. Function (a) is implemented by means of an input port descriptor 600 of which there is one per input port 501. Within that descriptor is a list of queue pointers 622 which refer to entries in a list of output queues 602. The list of queue pointers is indexed by the path address of a network egress port and by the priority which is afforded certain traffic traveling to that destination. Port 610 indicates the output port to which traffic placed in the queue will be forwarded.

With reference to FIG. 6, the list of output queues 602 contains summary information about each queue, the list of cells in memory 603 describes where the cells that form each queue are held, and the output port descriptor 601 refers to queues that have traffic waiting and ready for transmission through an output port 507 of FIG. 5.

With reference to FIGS. 5 and 6, one possibility is to provide one entry in the list of cells in memory 603 for each row in DRAM memory 504. For illustrative purposes, twelve entries are shown in list 603 although in reality the rows of DRAM memory 504 and entries in list 603 may number in the thousands. A chain of pointers using the "next" field 605 link together list entries for the rows of DRAM that contain cells belonging to a single queue. Head 613 and tail 614 are pointers to the head and tail of that queue. Length 611 is the number of cells in the queue and time 612 contains the time when a packet was added to an empty queue or the time when packets were last transmitted from the queue, whichever is the most recent. A queue is said to be ready with cells to transmit if the queue length 611 is at least equal to the burst size which is described below. In order that cells should not wait too long in a queue, the criterion for a queue being ready with cells to transmit preferably includes a check that length is non-zero and time is long enough ago to warrant expedited transmission.

Output port descriptor 601 refers to the multiplicity of queues that may be served by a given output port 507. Each queue within that set has an assigned priority. All queues that are ready with cells to transmit for a given output port are linked together in a chain using the pointer nextq 609. Head 620 and tail 621 point to the head and tail of that chain. When the output port is ready to accept a new cell or group of cells for transmission, control system 508 refers to the highest priority entry in list 601 for which there exists a queue that is ready with cells to transmit. A group of cells is removed from the queue and transmitted through output port 507. When the queue has been served it is removed from the head of the chain and if there are more cells ready to be transmitted the queue is moved to the tail of the chain.

As discussed above, the node illustrated in FIGS. 5 and 6 may be considered to have three modes of operation: (a) the node is acting as a multiplexer, (b) the node is acting as a switch, or (c) the node is acting as a demultiplexer. When the node is operating as a multiplexer the burst size is preferably equal to the number of output ports 507, i.e., the burst size is n. When the node is operating in modes (b) and (c) group formation is not required, so the required burst size is one cell. Also when operating in modes (b) and (c), there is one output port descriptor 601 for each output port 507. When one of these output ports is ready to accept another cell for transmission, control system 508 extracts one cell from the highest priority queue with traffic ready to transmit to this port. However, when control system 508 is operating as a multiplexer there is only one output port descriptor 601. The n output ports 507 for the node may be considered as a single output port which transmits n cells concurrently. When the output port is ready to take more traffic, control system 508 serves the highest priority queue that has a group of cells ready for transmission and it sends one cell to each of the n output ports 507. The first cell, taken from the head of the queue, goes to output port number 0, the second to output port number 1 and so on. If it should be that there are fewer than n cells available, control system 508 completes the group by fabricating and transmitting a sufficient number of NULL cells addressed to the same destination set as the other cells of the group.

Example of Node Operation

An example of the operation of a node in connection with sample data will now be explored in connection with the 5-stage network shown in FIG. 2, the model of FIG. 3, and with the structure of the node illustrated in FIG. 5.

Consider cells with priority 1 traveling from A to X. Each cell has in its header the path address "101". Path addresses for the egress ports S through Z are shown in FIG. 3. Cell A[1] enters port 0 of node 10 in set 210. The input port descriptor 600 for input port 0 contains entries for all eight egress ports, and the priority 1 queue pointers for these point to four queues, one each for cells that will be routed through sets 250 through 253 in stage 5. Stage 5 is the output stage which matches input stage 1. The queue pointer 622 for path address 101 refers to the queue associated with set 252 because that is the set in stage 5 through which cells directed to egress port X must pass. Any cells that enter this queue are mutually compatible candidates for forming a group that will eventually be dismantled in set 252. Cell A[1] is placed in queue for set 252. When cell A[2] enters node 10 it joins the same queue and that brings the queue length to 2, equaling the burst size n, so the group A[1,2] is immediately scheduled for transmission. The group travels to ports 0 in nodes 20 and 21 of set 220. There are just two priority 1 queues in each of these two nodes, one each for sets 240 and 241. Set 241 is the set through which A[1,2] must pass in order to reach X. The two cells wait there, one in each of nodes 20 and 21, until A[3,4] joins them. The queue length in each of the nodes 20 and 21 is now 2 and equals n, so the group A[1,2,3,4] is ready to be transmitted. The four cells of that group next travel concurrently on paths 263, 264, 265 and 266 to reach the four nodes of the center stage, set 230.

Every node in the center stage, in common with the nodes in all output stages, has one queue per priority level for each of its output ports 507. Incoming cells are directed towards the output port that is en route to the egress port addressed in the cell header. The burst size is one, so cells are ready to be transmitted when they reach the queue head. Thus, A[1,2,3,4] leaves the center stage through its ports 1, and thence travels to the two nodes in set 241. At this time A1 moves ahead of A3 when they are both placed in the output queue for port 0 of node 42. In effect, the group which was formed in set 220 is dismantled, A[1,2] moves ahead of A[3,4] in set 241. The process is repeated when A[1,2] enters node 52 of set 252. Both cells are enqueued for output port 1 which leads to egress port X, A[1] being the first to exit the switching network.

As noted above, the clocking for the node may operate at a different frequency than the clocking of the rest of the switch. For example, the node may have its own internal clock which is not necessarily synchronized with the clock of the network.

Figure 8A:
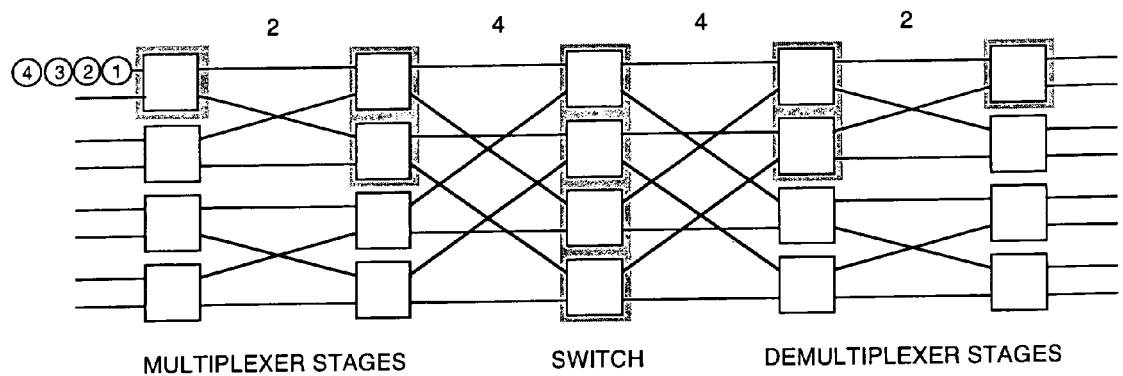
FIGS. 8(a) through 8(u) illustrate an example of how cells may pass through a 5-stage switching network composed of 2 by 2 nodes in accordance with an aspect of the invention.
Figure 8B:
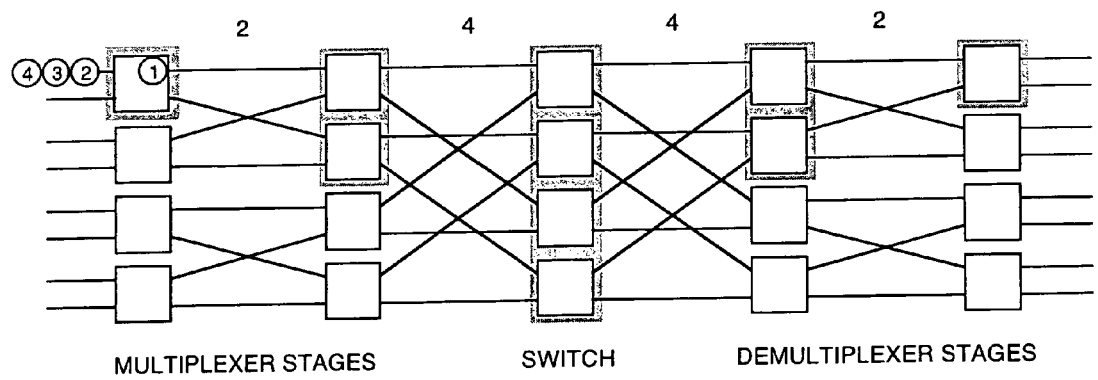
Figure 8C:
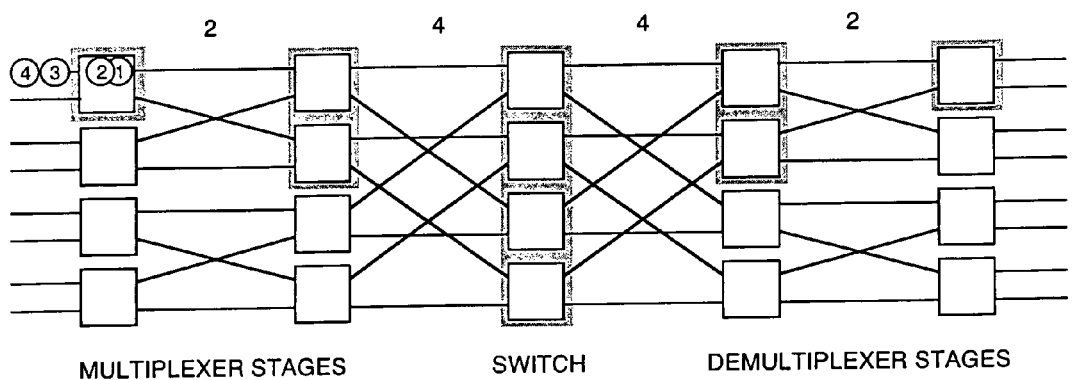
Figure 8D:
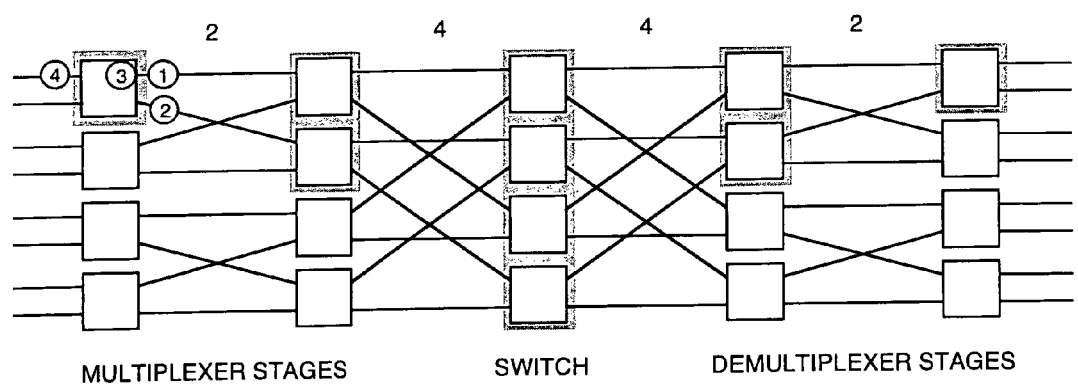
Figure 8E:
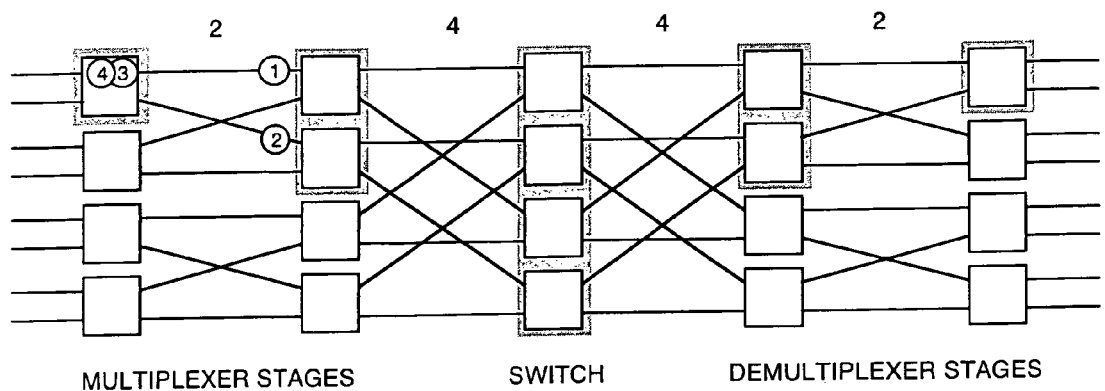
Figure 8F:
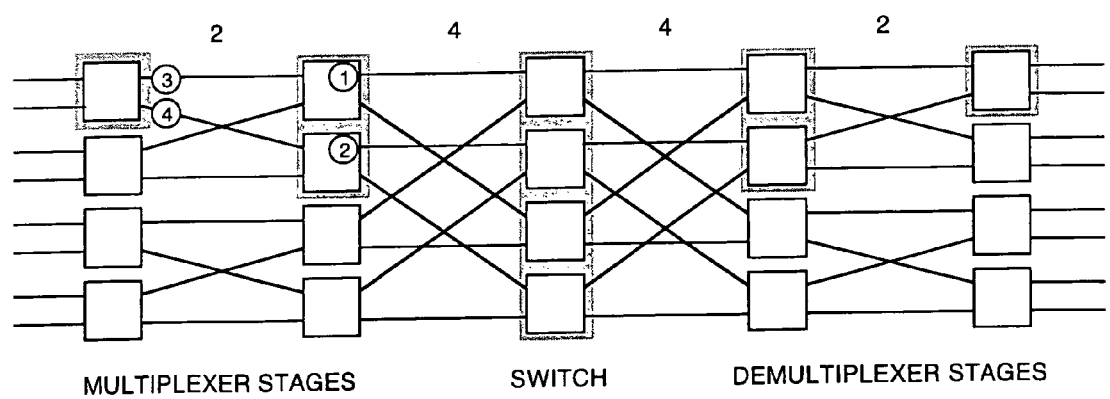
Figure 8G:
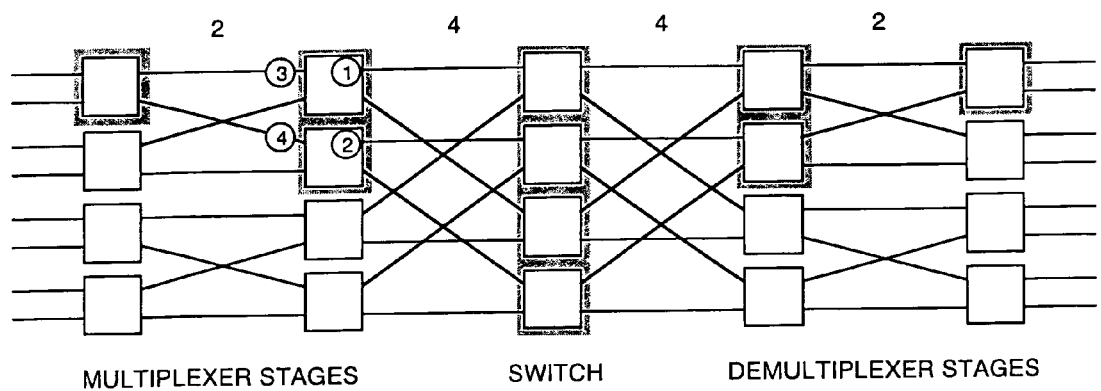
Figure 8H:
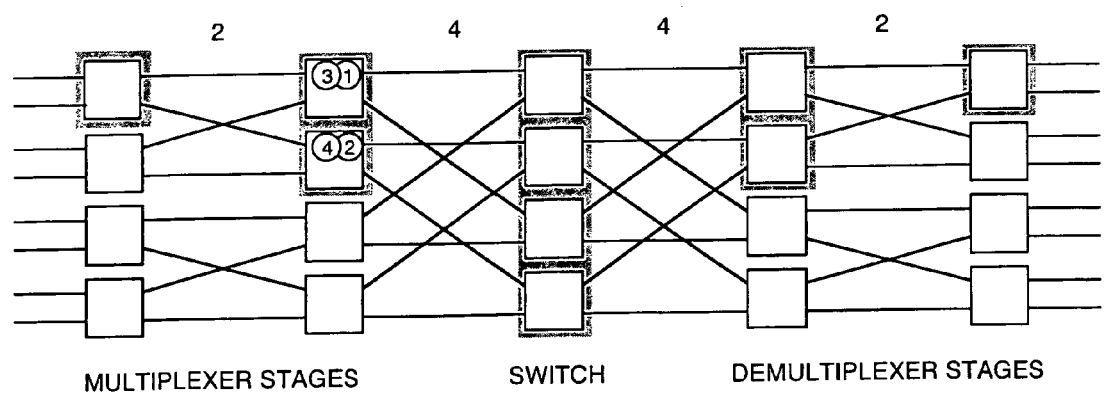
Figure 8I:
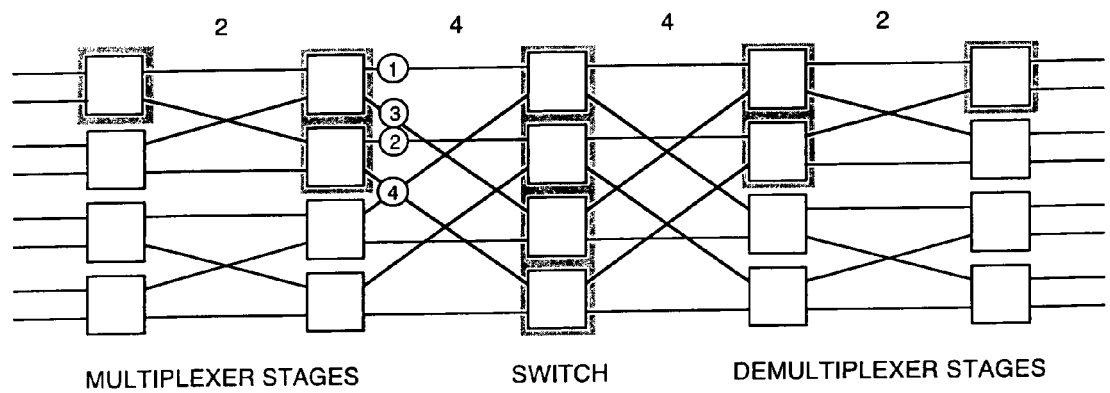
Figure 8J:
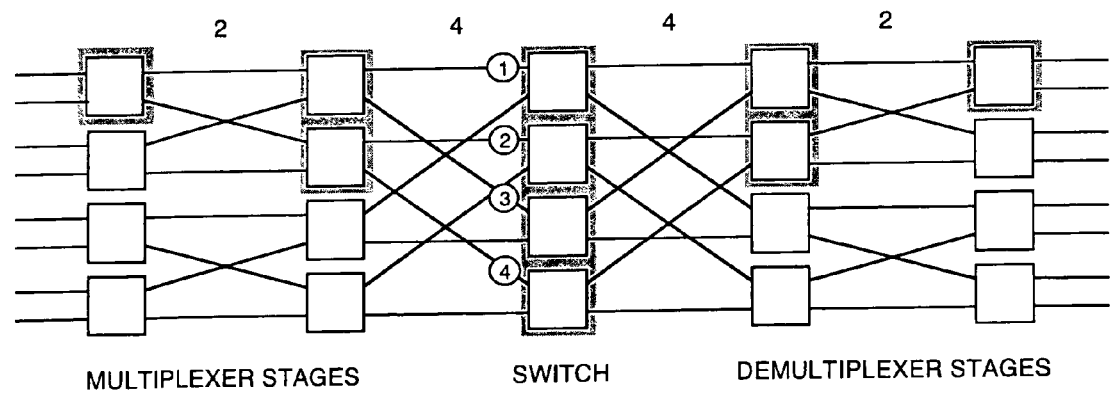
Figure 8K:
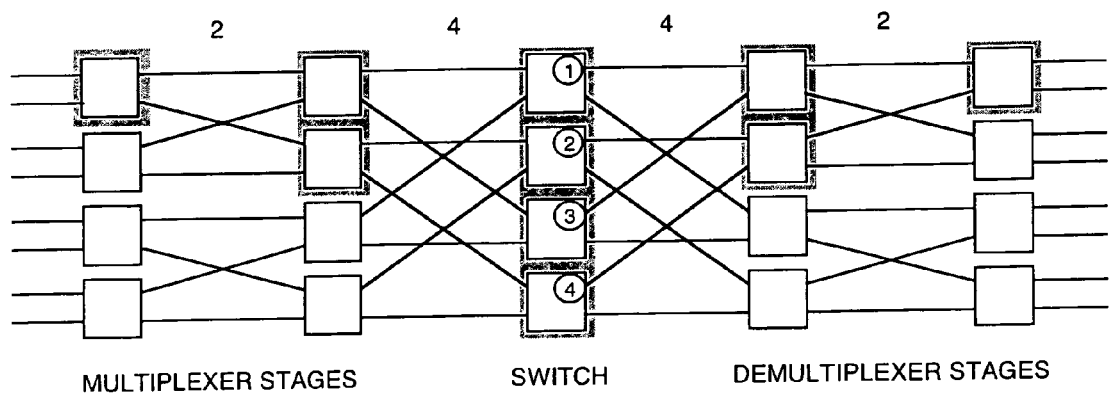
Figure 8L:
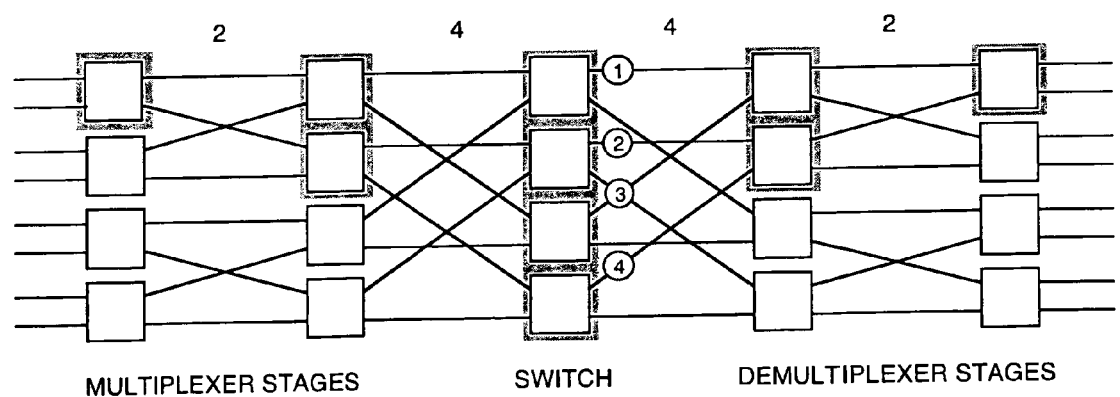
Figure 8M:
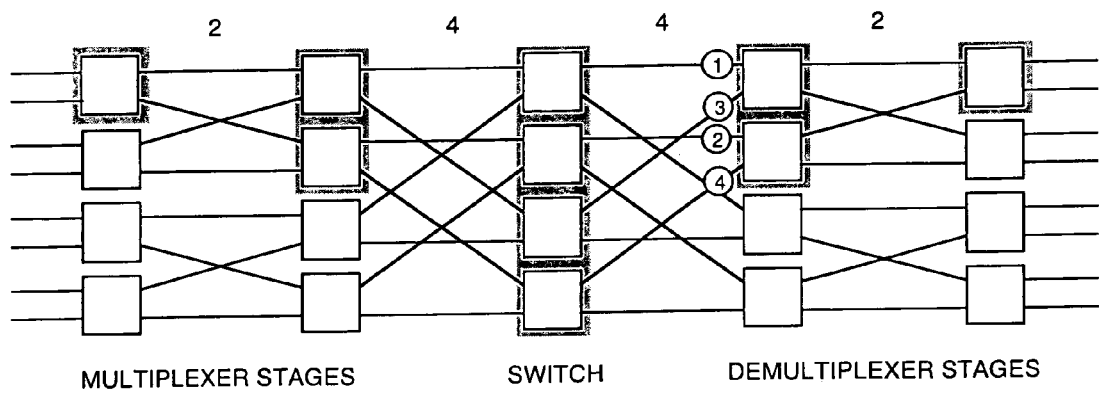
Figure 8N:
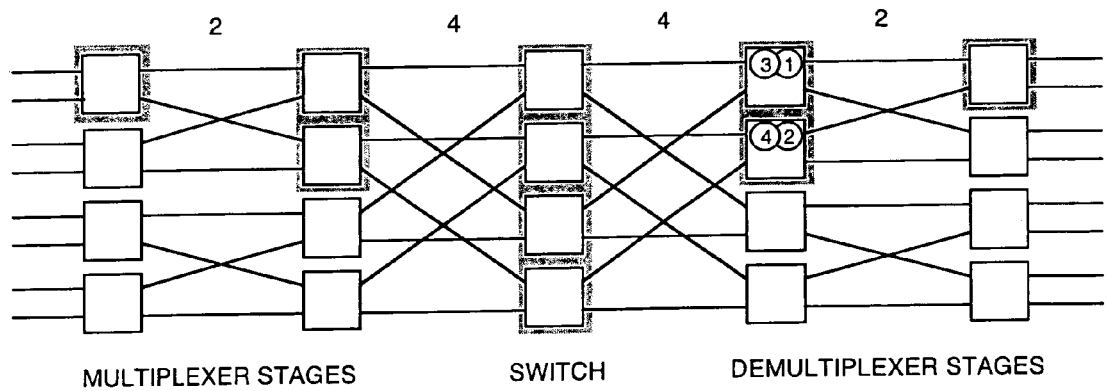
Figure 8O:
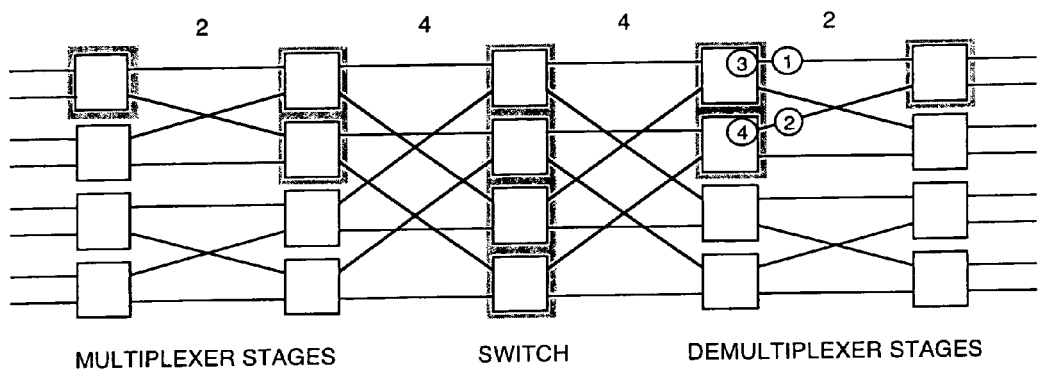
Figure 8P:
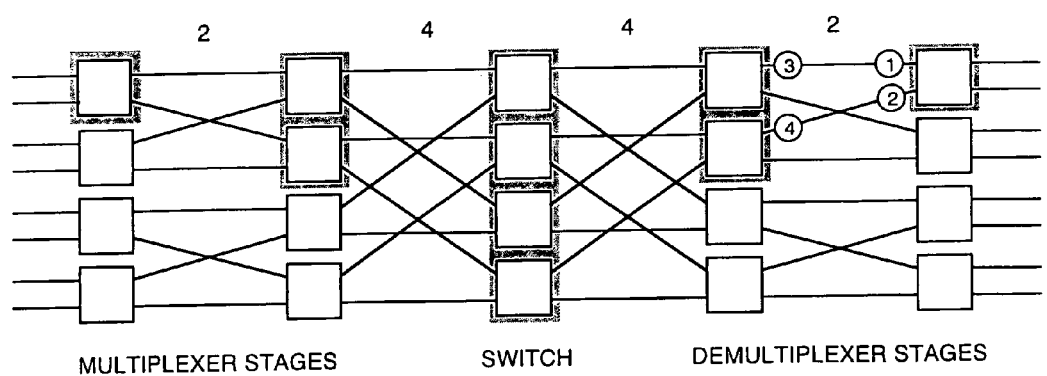
Figure 8Q:
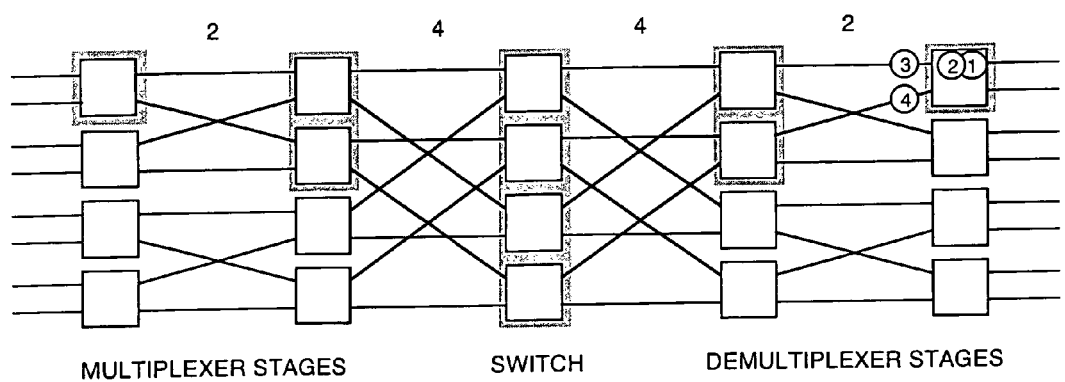
Figure 8R:
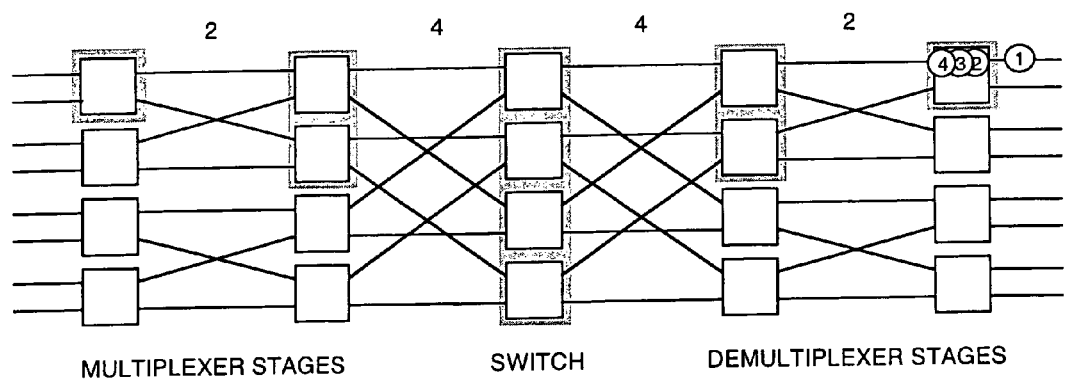
Figure 8S:
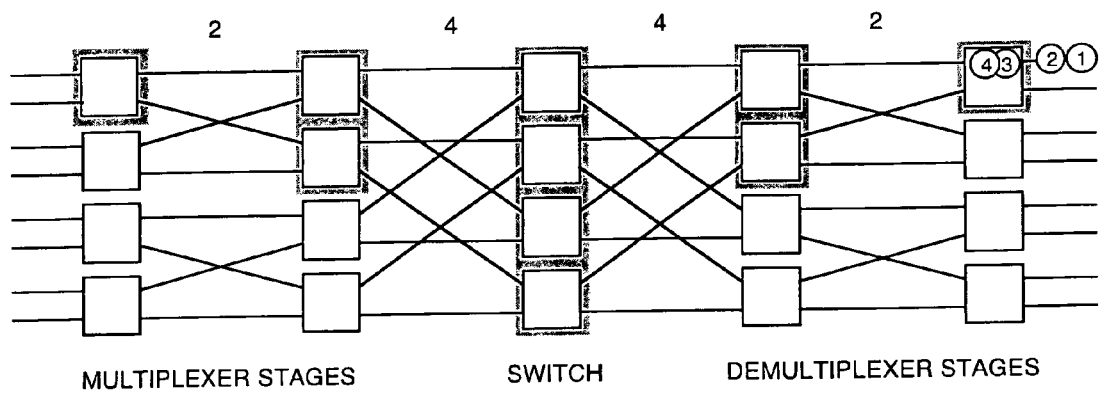
Figure 8T:
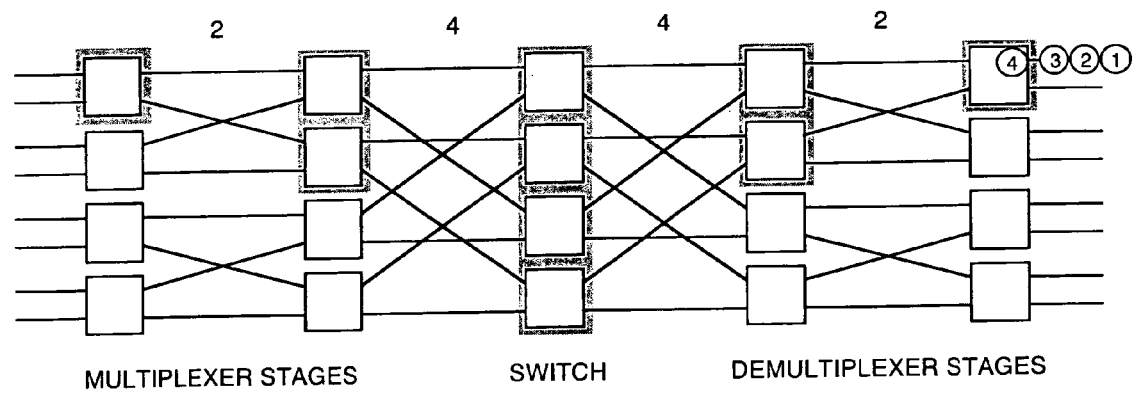
Figure 8U:
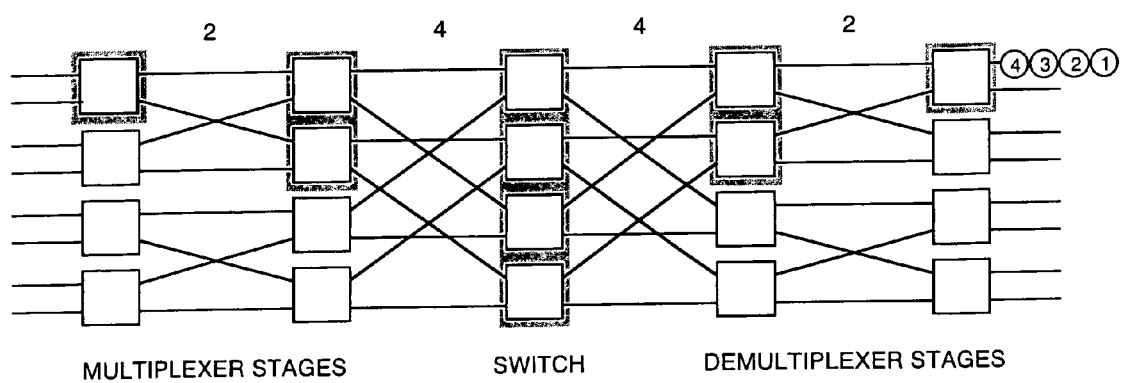

FIGS. 8(a) through 8(u) illustrate an example of how cells may pass through a 5-stage switching network composed of 2 by 2 nodes in accordance with an aspect of the invention. The traffic consists of four cells which enter ingress port zero on the left and depart through egress port zero on the right. As illustrated, queues build up in the multiplexer nodes until a group has been assembled, those groups are then broken down as the cells pass through the demultiplexer nodes. It is not necessary to provide explicit coordination between the nodes because each node uses the same criteria to decide what to do next.

Figure 9A:
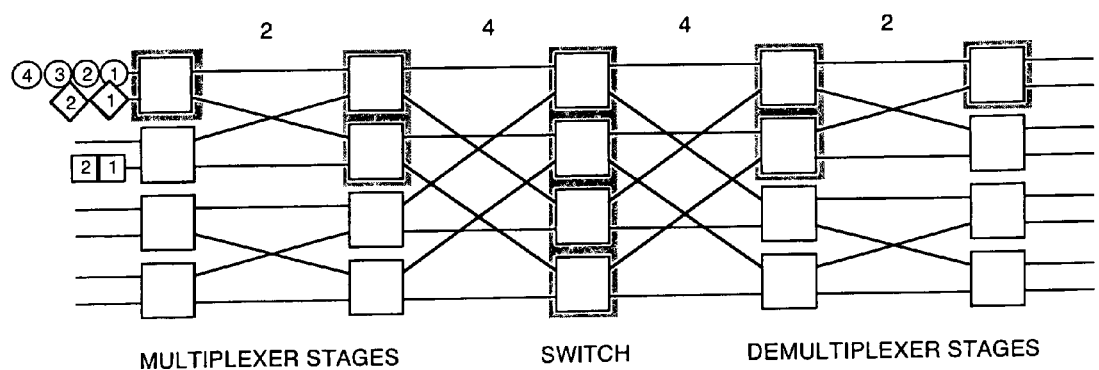
FIGS. 9(a) through 9(r) illustrate an example of how three independent flows of cells may pass through a 5-stage switching network composed of 2 by 2 nodes in accordance with an aspect of the invention.
Figure 9B:
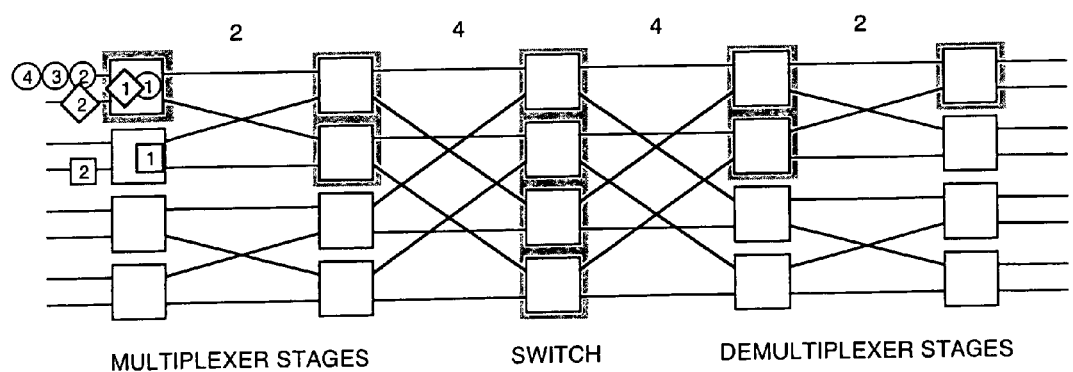
Figure 9C:
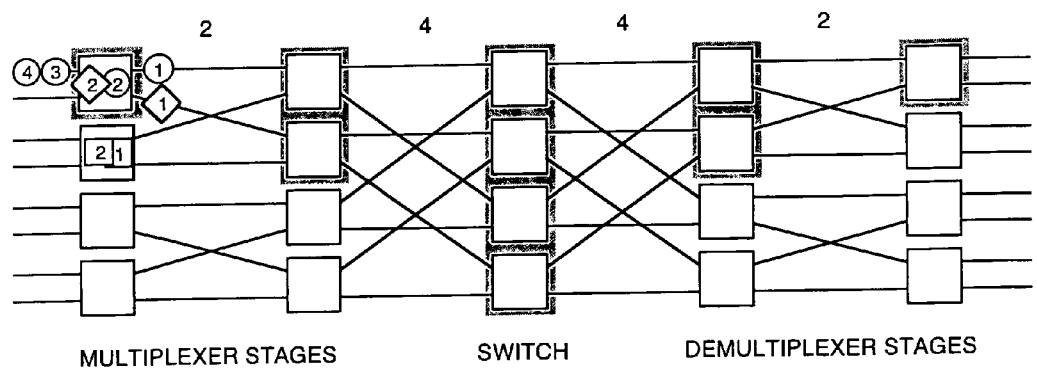
Figure 9D:
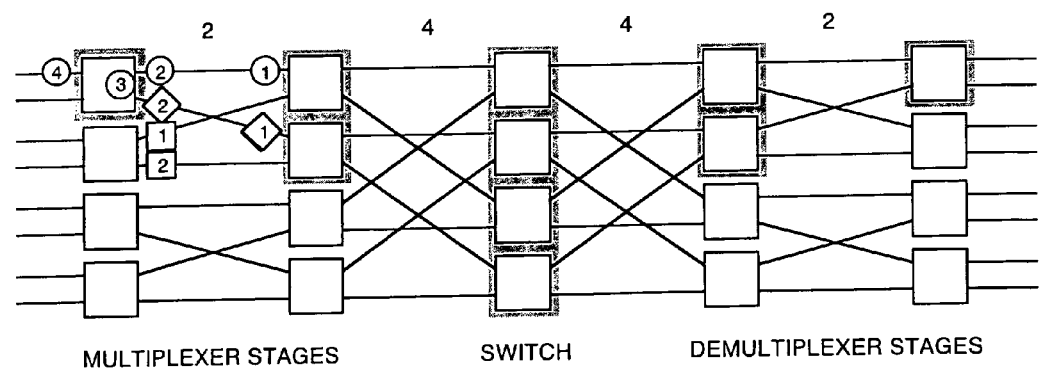
Figure 9E:
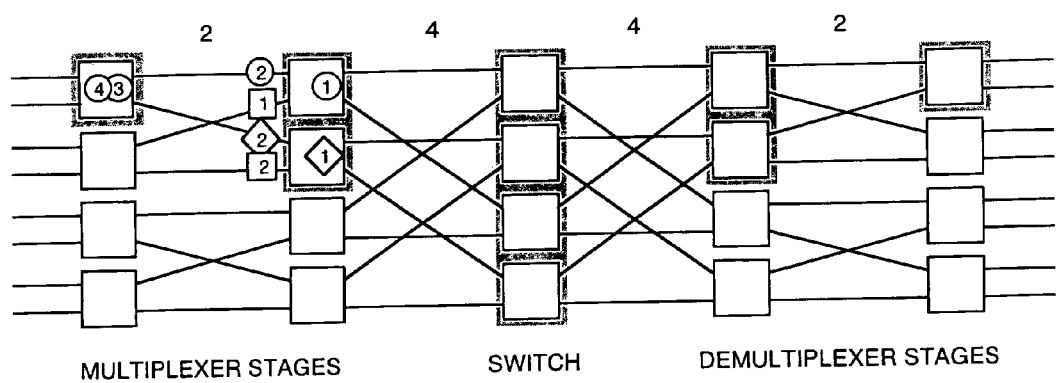
Figure 9F:
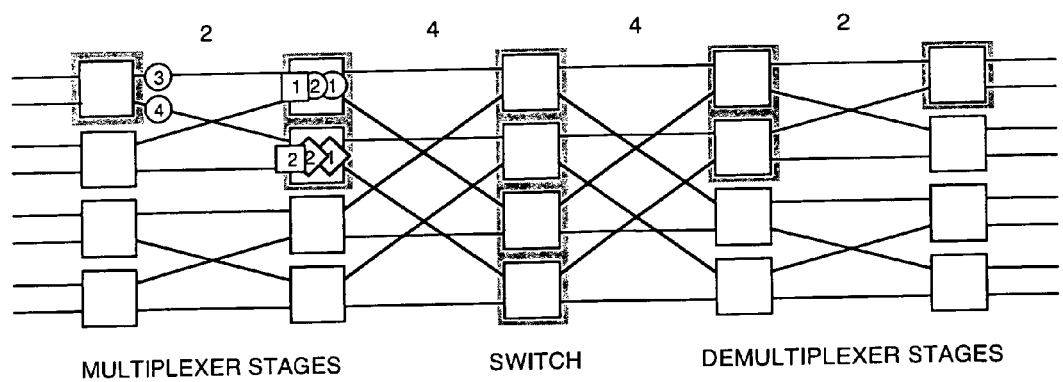
Figure 9G:
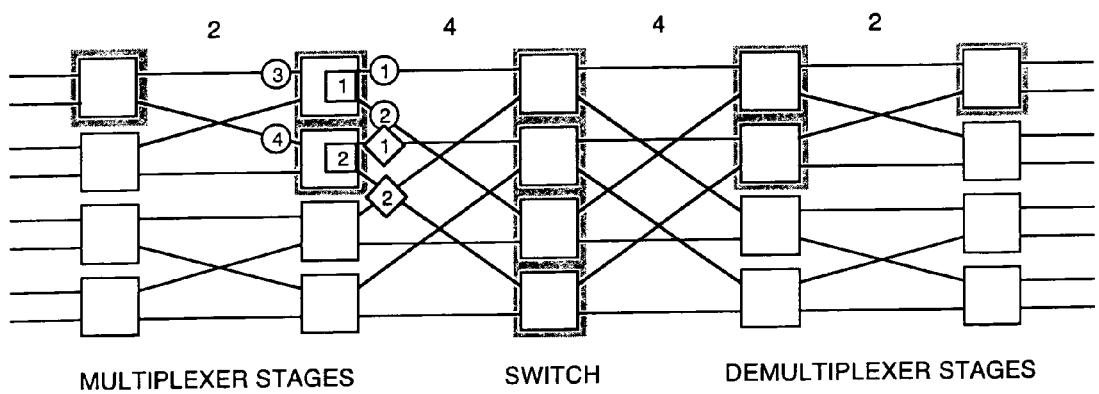
Figure 9H:
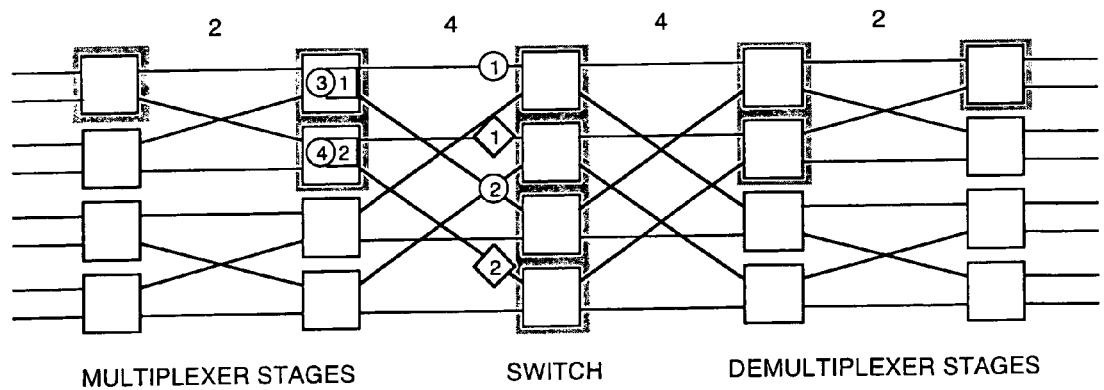
Figure 9I:
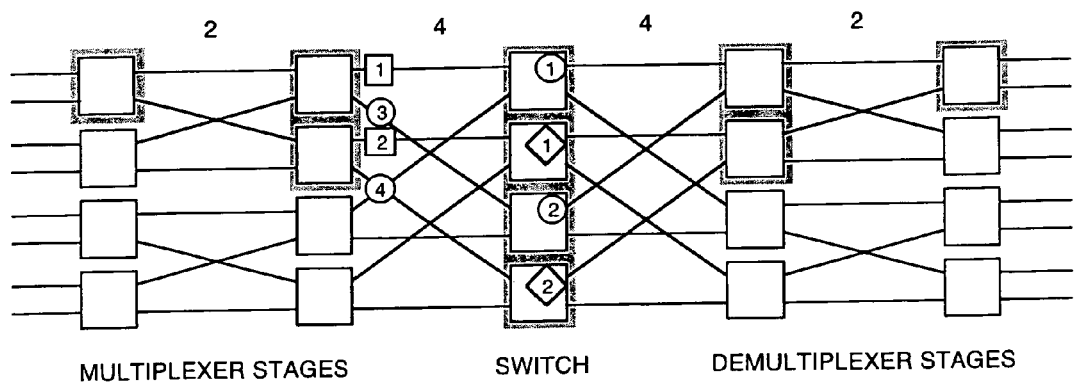
Figure 9J:
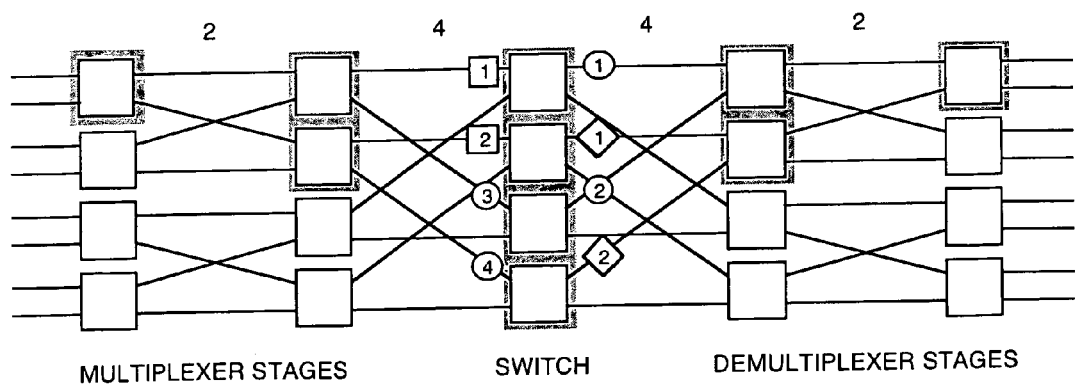
Figure 9K:
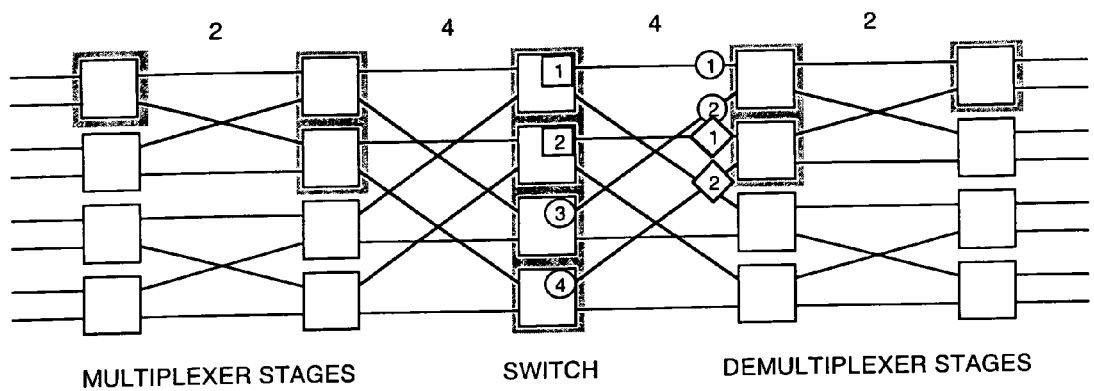
Figure 9L:
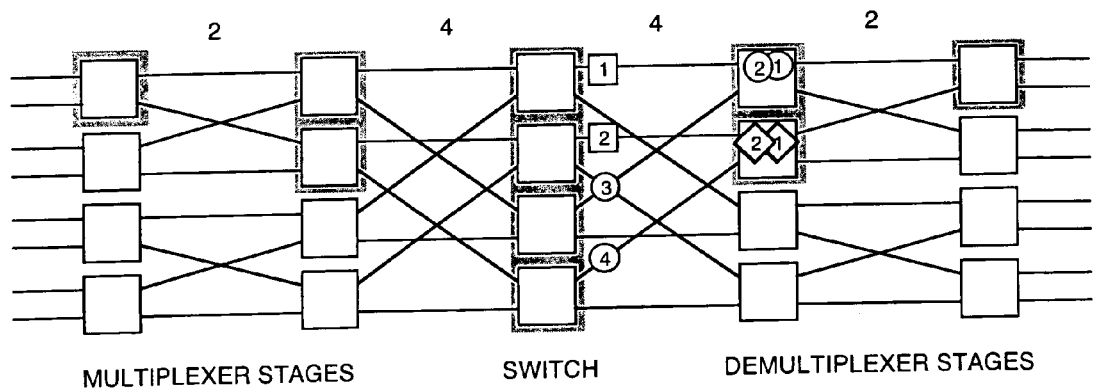
Figure 9M:
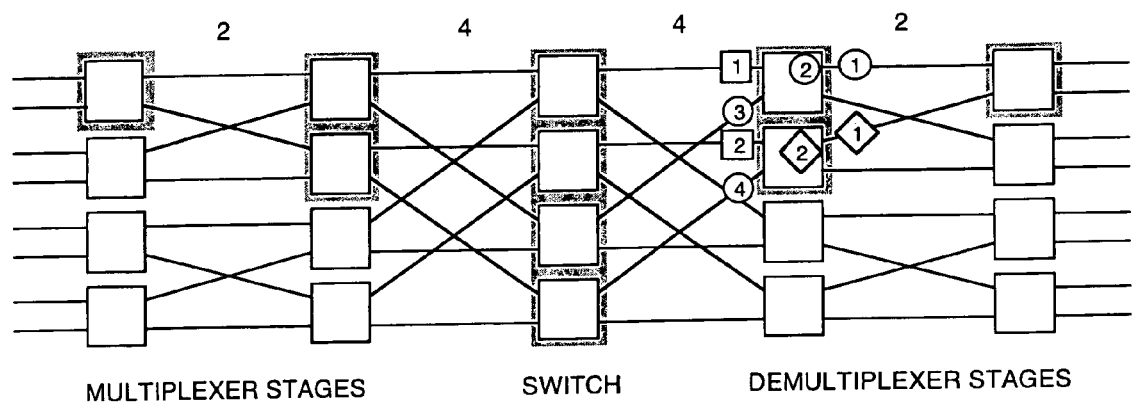
Figure 9N:
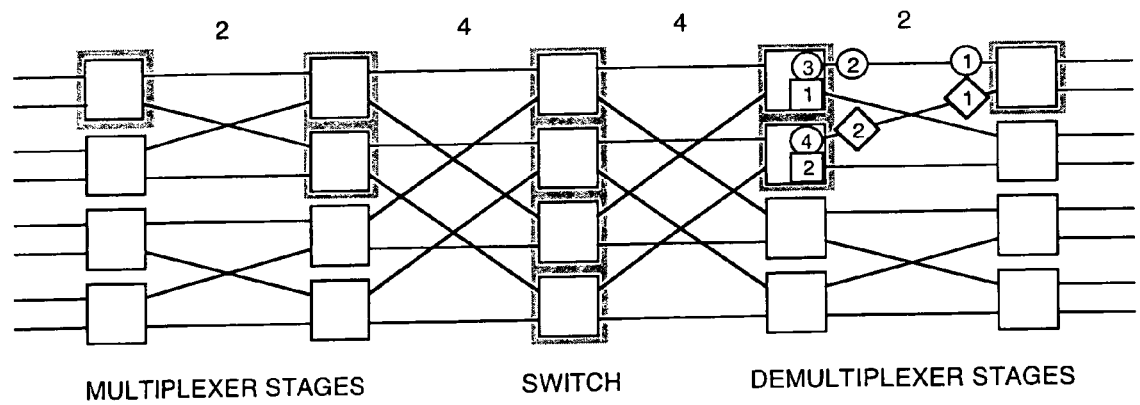
Figure 9O:
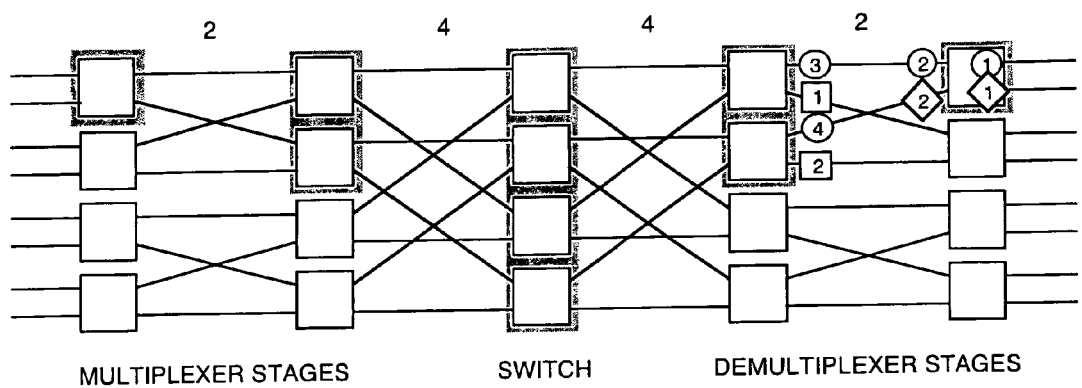
Figure 9P:
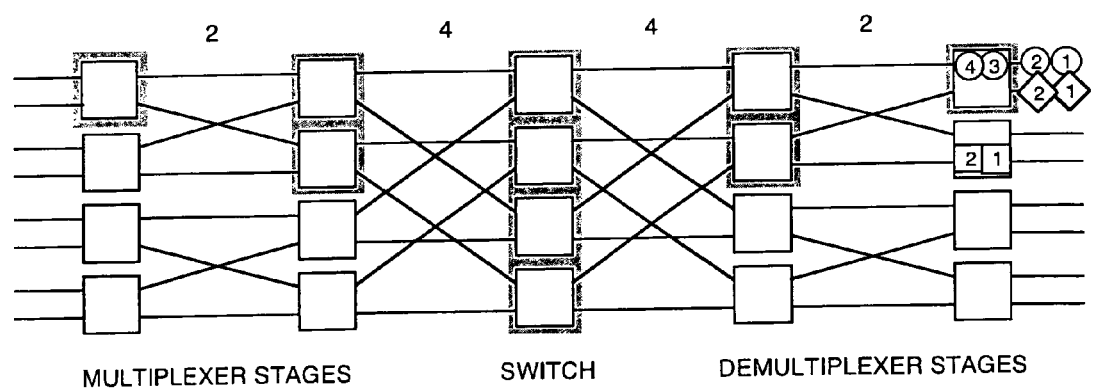
Figure 9Q:
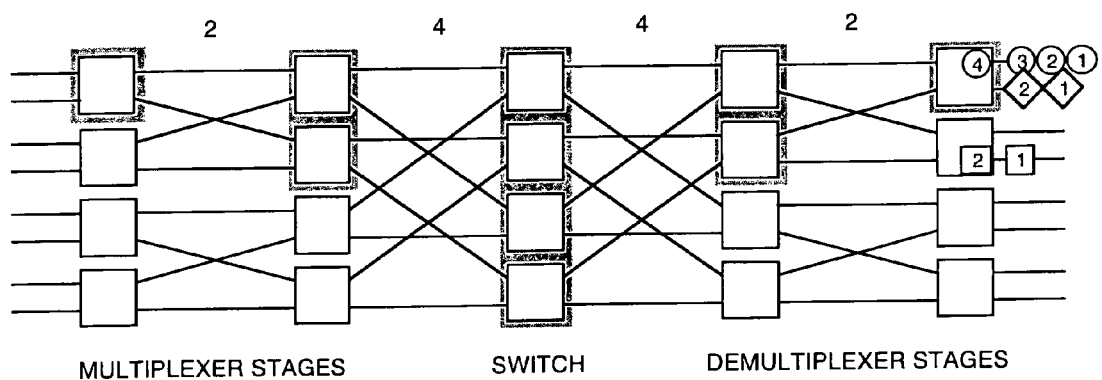
Figure 9R:
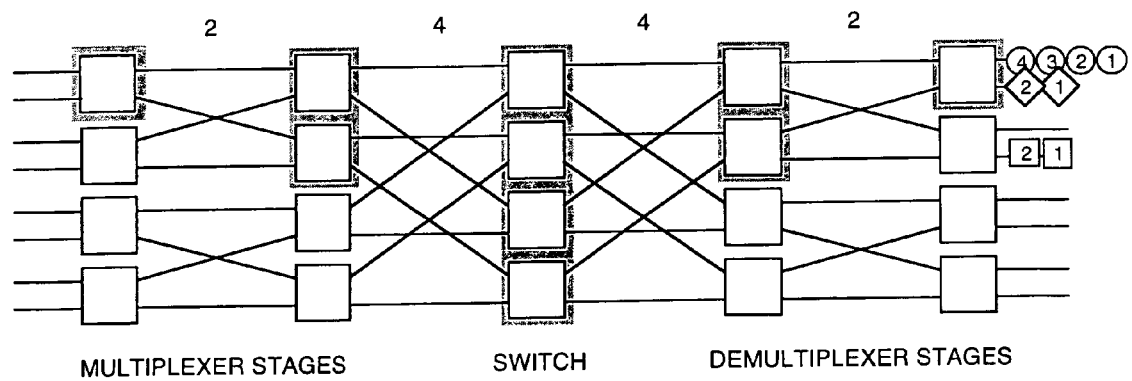

FIGS. 9(a) through 9(r) illustrate another example of traffic flow, this time involving three independent flows of cells which are to be passed through their switch to their mirror opposite egress ports. Each of the three independent flows are represented in the illustration by different shading. The cell packets of the flows may be such that the content information embodied in one flow is completely unrelated to the content information in another flow. The numerals within the cells indicate the order in which the cells arrived at the switch. It will be seen that cells from disparate flows can combine to form groups if they are heading towards the same destination node. In the final demultiplexer stages, one of the flows separates out, passing through a different node than the other flows. In accordance with an aspect of the invention, the packet sequence is preserved for all flows. It may also be noted that even though there is extra traffic, the cells that are input and output on the uppermost ingress and egress ports actually pass out of the switch in fewer clock pulses than if the other cells were not present (compare FIG. 8). In other words, the presence of additional traffic increased, rather than decreased, the speed with which the packets of data passed through the switch to their intended egress port.

Node Coordination

It is preferable that after disassembly the cells of a group are in the same sequence that they had before the group was formed. This will generally happen if the nodes within each set are synchronized with one another and if node behavior is entirely deterministic. The cells of a group which pass through separate nodes in a set are preferably scheduled for transmission at the same time so that they arrive simultaneously at the next stage. Sufficient synchronization may be achieved by using a single clock source and a single start of frame signal for all node inputs within a given set. At the start of frame every node in the set starts to scan its input ports, starting with port number zero. At the same time it provides traffic to its output ports, and when transmitting a group of cells it sends the cells in sequence through the output ports starting at port zero. Deterministic operation means that when two nodes are presented with the same traffic at their inputs they enqueue that traffic in identical manner and they make identical decisions about which queue to serve next.

Flow Control

This switch performs well with heavy traffic, particularly if the sources of traffic are regulated so that the volume entering the network does not exceed the capacity of the egress ports. A flow control protocol for this purpose may be implemented external to the switch. One such method is described in Shang-Tse Chuang, Ashish Goel, Nick McKeown and Balaji Prabhakar, "Matching Output Queuing with a Combined Input and Output Queued Switch", Proceedings of Infocom, 1999, incorporated herein by reference.

It is believed that if the egress ports are not overloaded, this switch will not block. However, when traffic is very light, the process of group assembly might be starved through want of sufficient traffic. There are at least three mechanisms which may be provided to handle this situation. First, when a node within an input stage scans its queues for the next queue to serve it should consider any queue that has remained non-empty without being served for longer than a certain period of time. Time 612 in list 602 provides for that situation. Second, control system 508 may be able to flush a queue when requested.

NULL cells may be used to complete a group when there are insufficient cells already waiting. While the practice of inserting NULL cells expedites delivery of incomplete groups, it can cause congestion within the switch if the switch is already heavily loaded with traffic. Therefore it is preferable to use an adaptive technique when deciding whether or not to transmit an incomplete group. That technique should discourage transmission of incomplete groups in heavy traffic conditions.

Figure 10A:
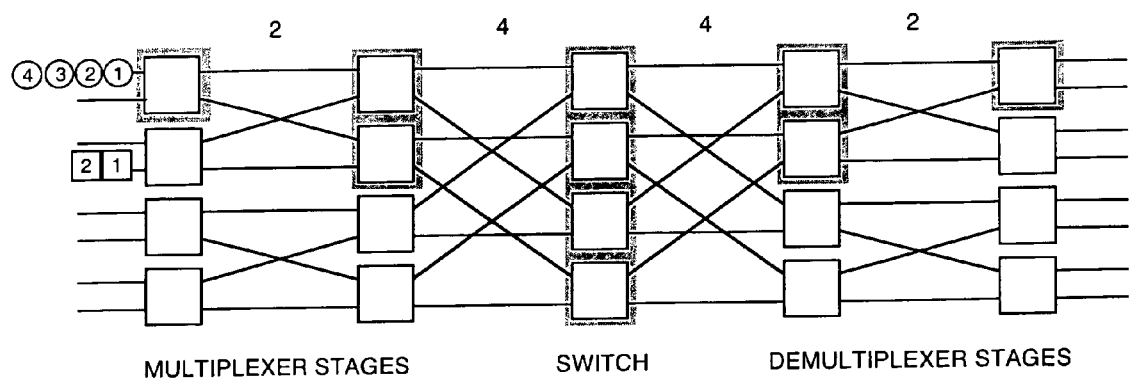
FIGS. 10(a) through 10(t) illustrate an example of the management of NULL cells in accordance with an aspect of the invention.
Figure 10B:
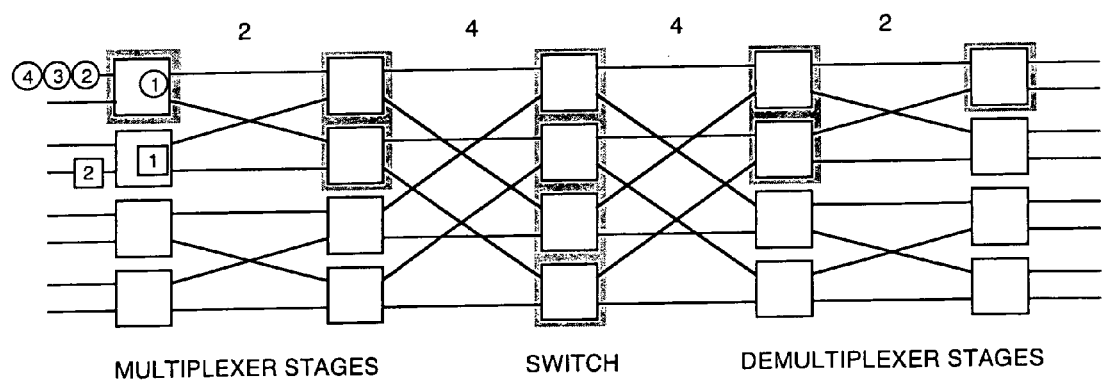
Figure 10C:
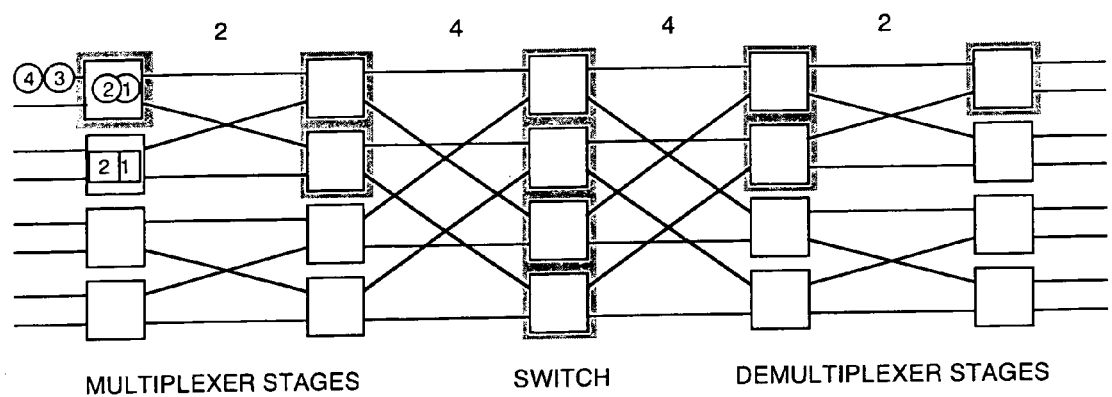
Figure 10D:
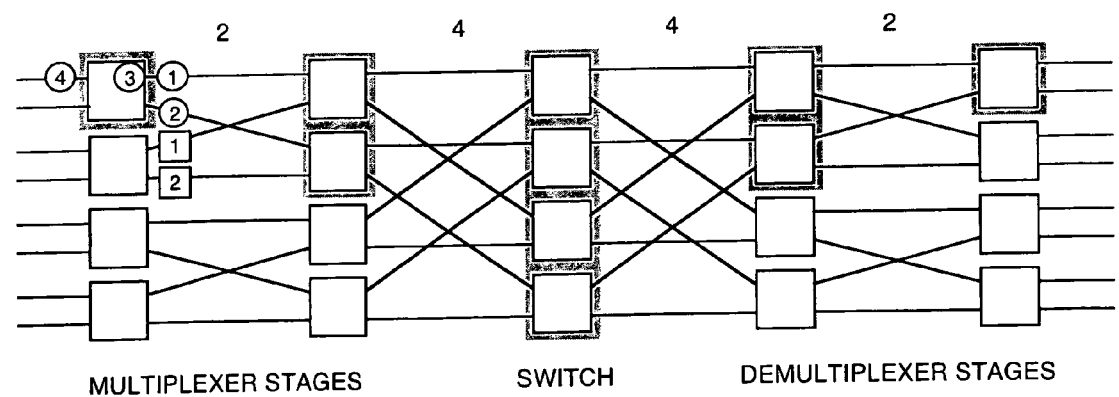
Figure 10E:
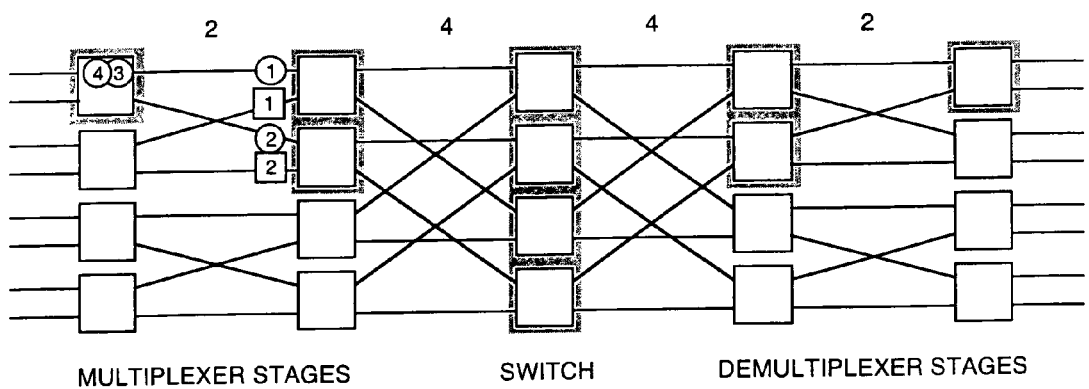
Figure 10F:
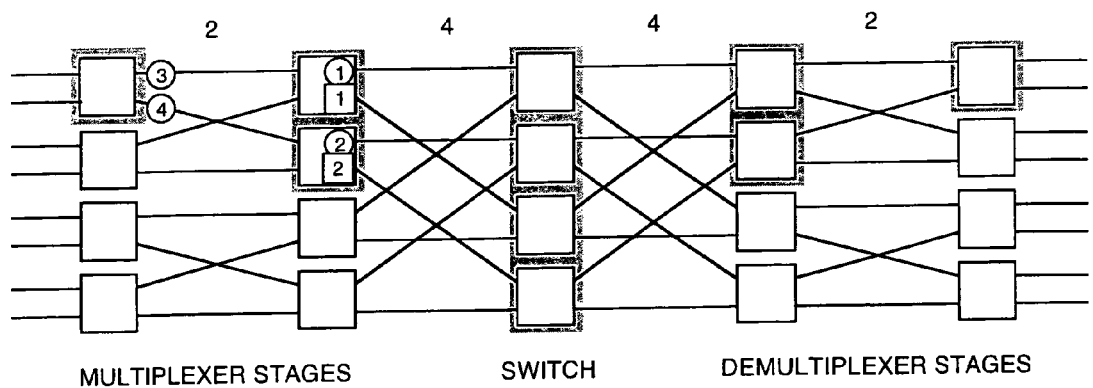
Figure 10G:
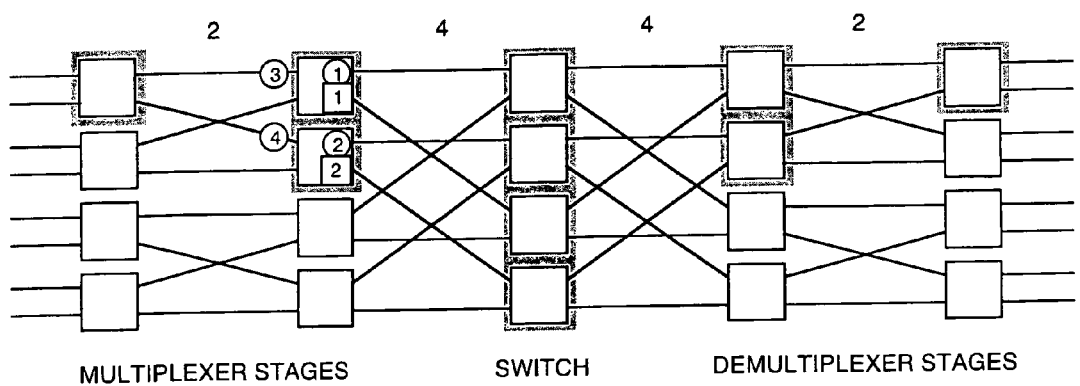
Figure 10H:
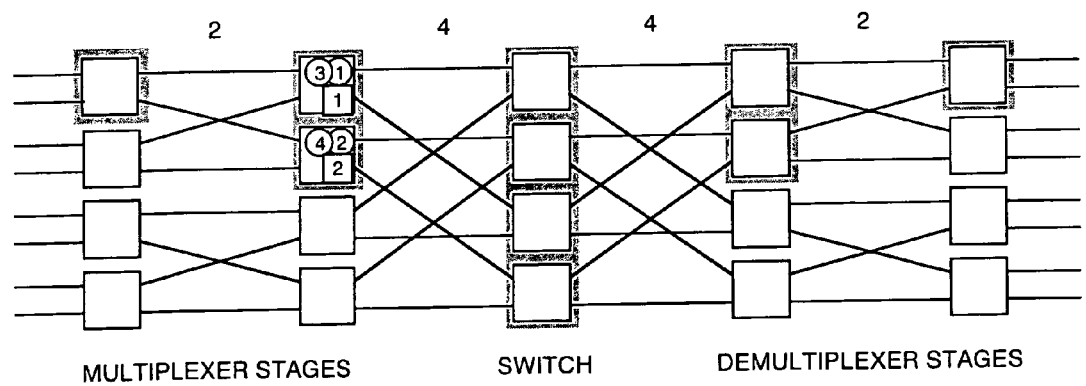
Figure 10I:
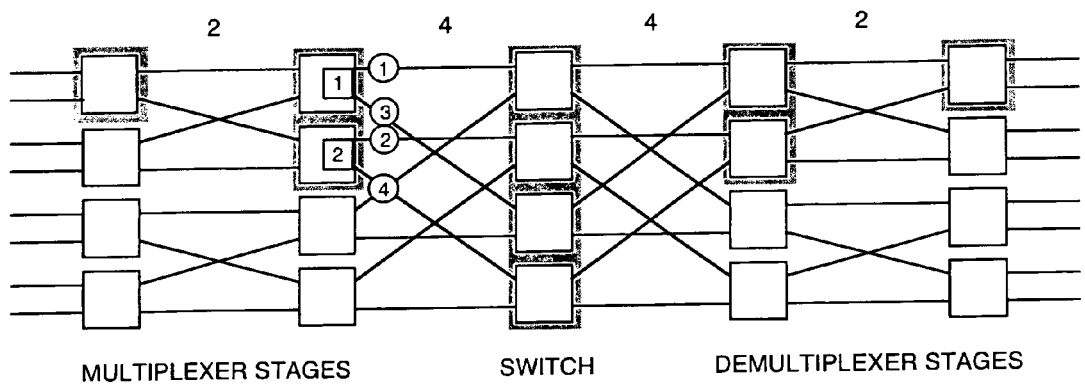
Figure 10J:
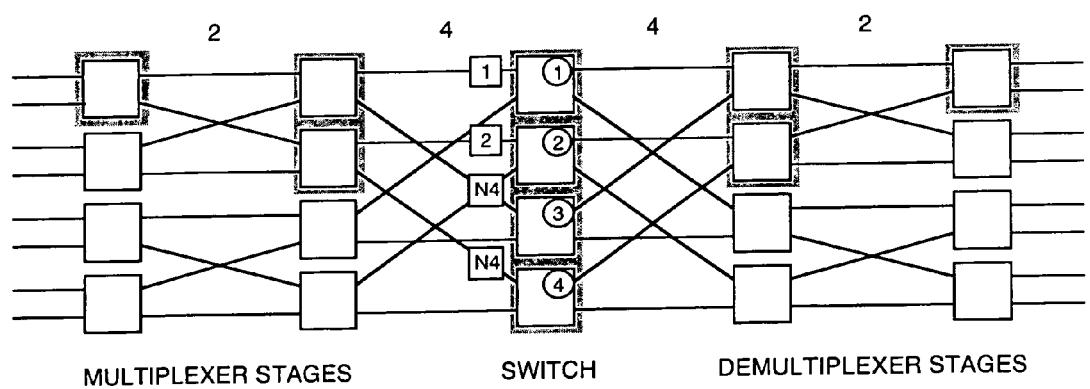
Figure 10K:
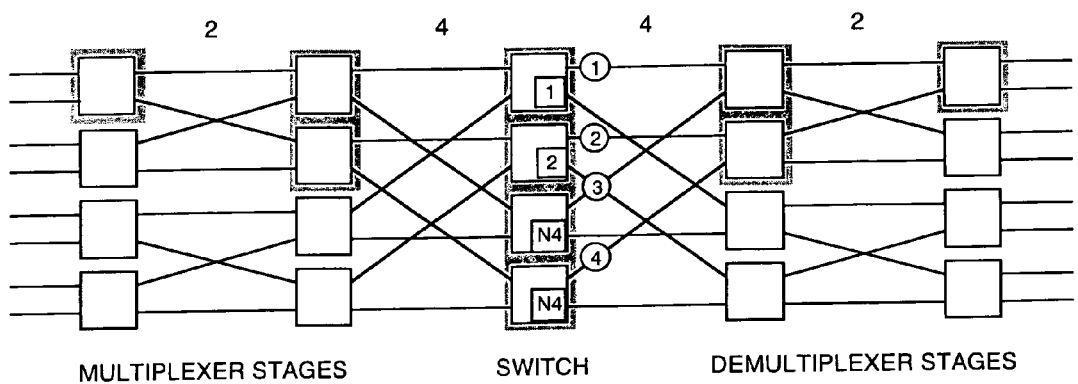
Figure 10L:
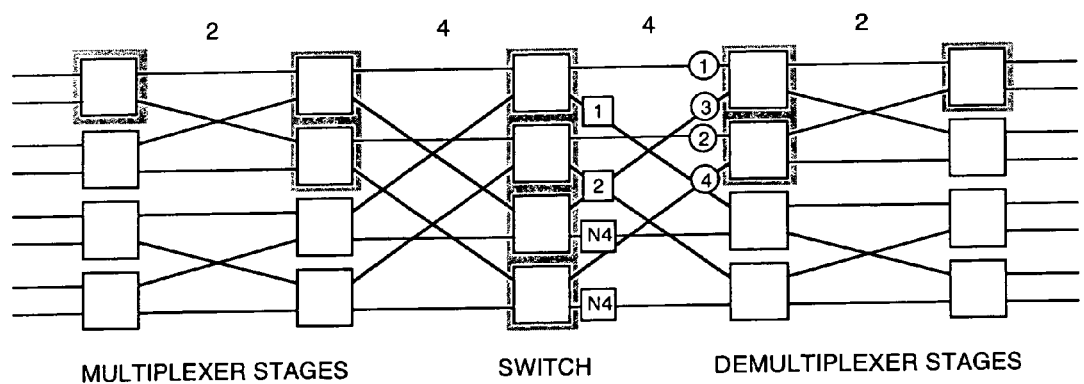
Figure 10M:
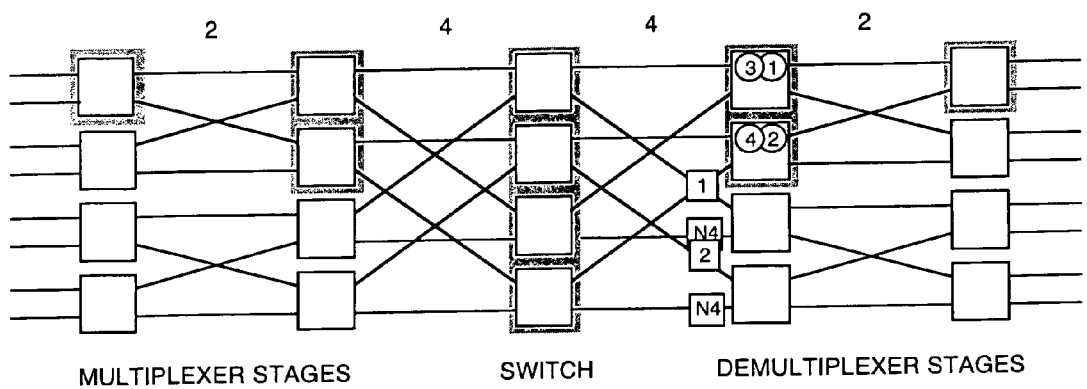
Figure 10N:
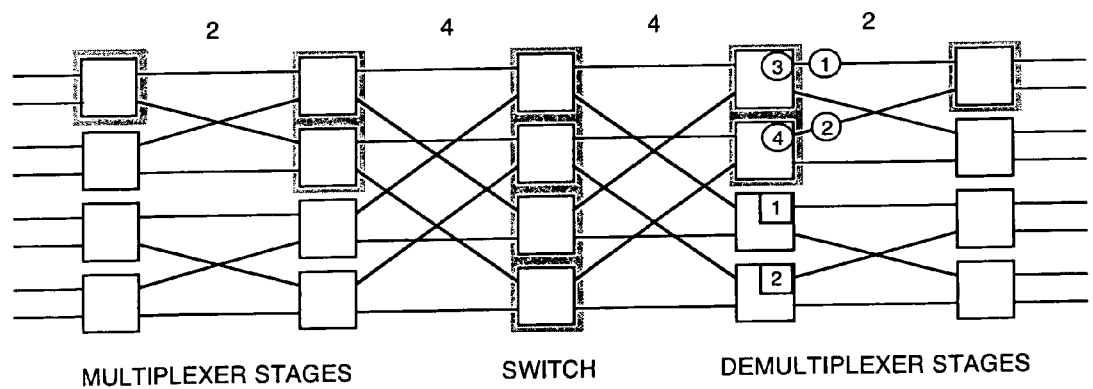
Figure 10O:
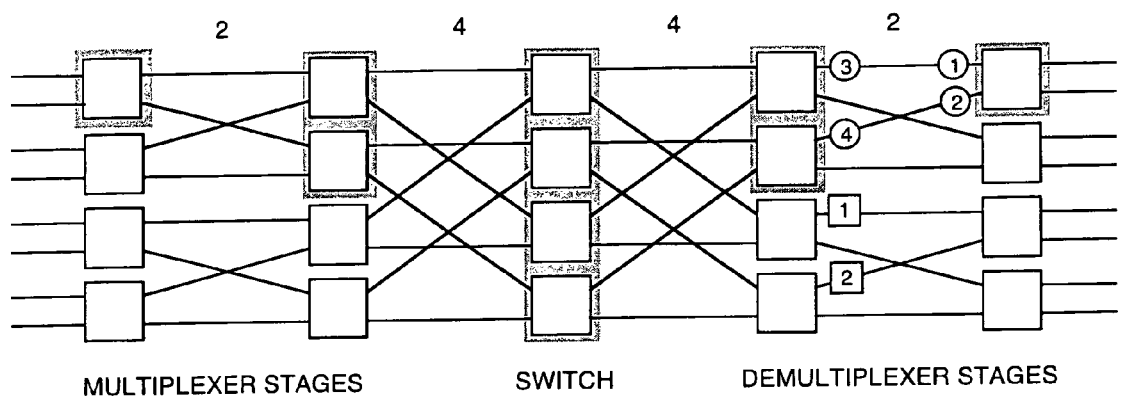
Figure 10P:
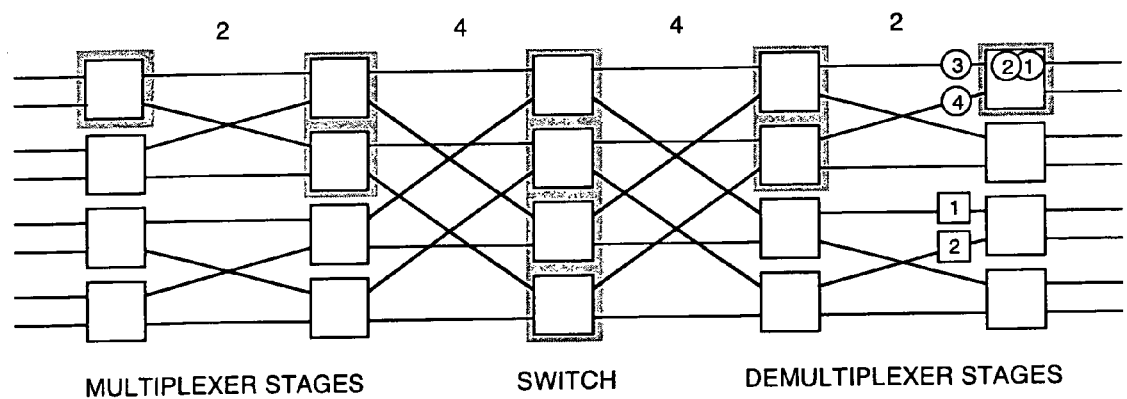
Figure 10Q:
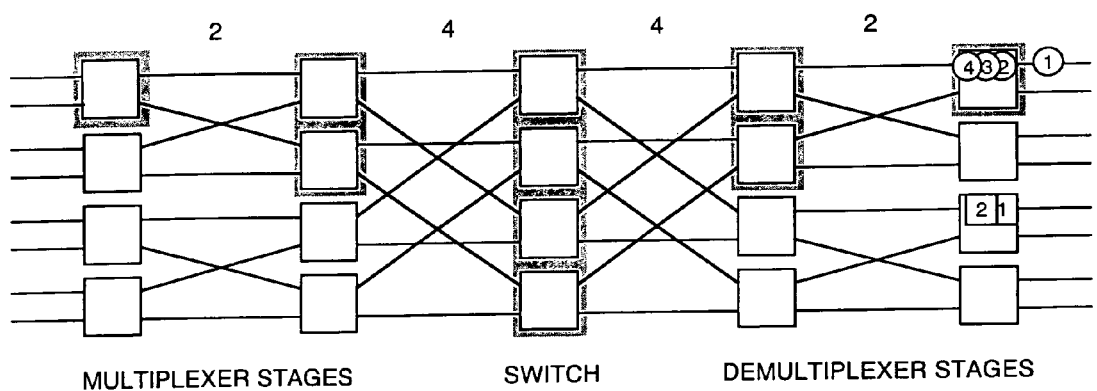
Figure 10R:
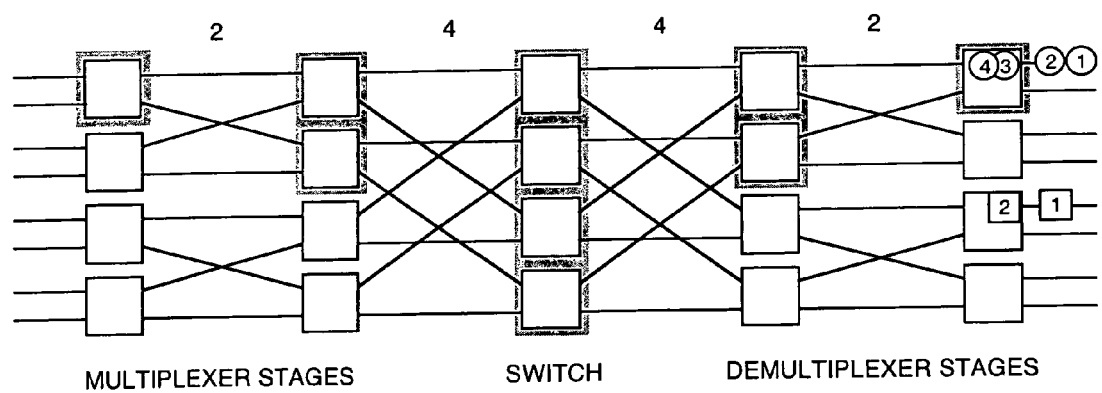
Figure 10S:
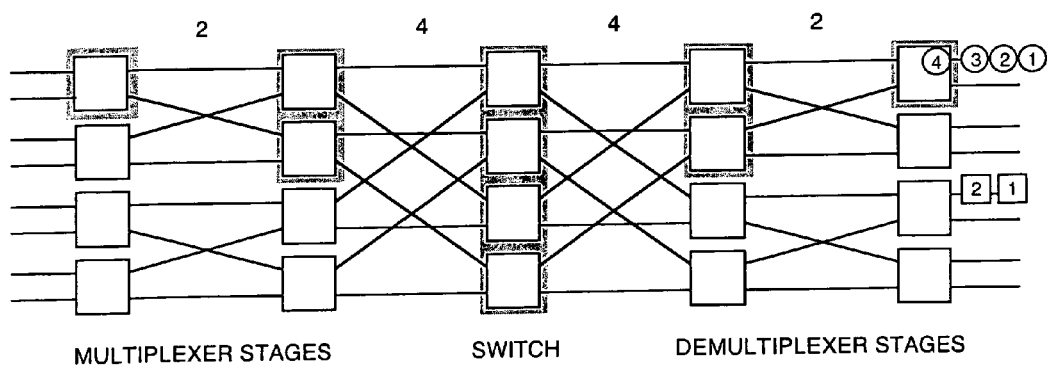
Figure 10T:
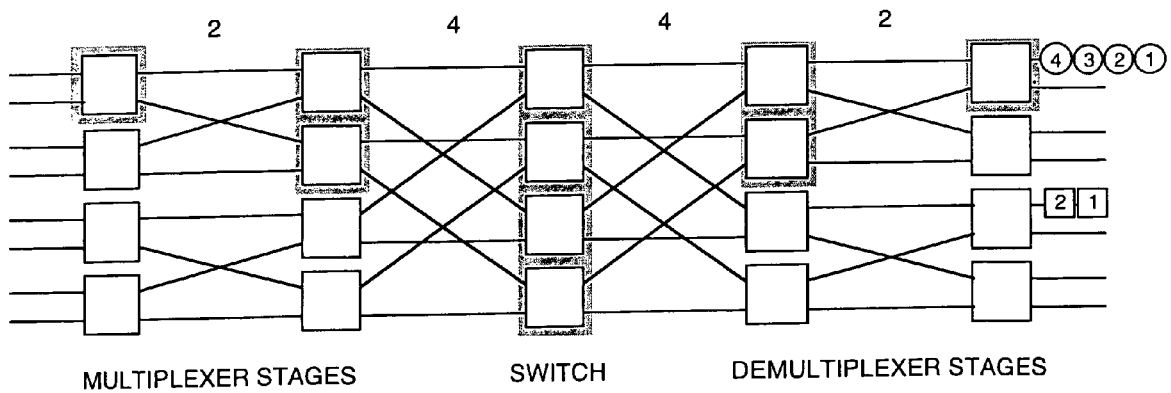

FIGS. 10(a) through 10(t) illustrate an example of how NULL cells may be used to complete a group. The flow of cells from one of the middle ingress ports to the opposite egress port, in this example and in the absence of other traffic, arrives at a point in the second stage where there are insufficient cells to form a group. Accordingly, two NULLs are inserted in stage 2 in order to expedite the cell flow, and those NULLs are discarded as they enter stage 4.

NULL cells may be created in the input stages of the switch and are discarded in the output stages. A NULL created by the cell output process of a node in input stage i is discarded by the cell input process of a node in stage $2k-i$. It may be said that the node in stage i is the "source" of the NULL and the node in stage $2k-i$ is the "destination" of that NULL.

It is the presence of that NULL on the intervening transmission lines between the source and destination nodes that has the potential to cause congestion. Therefore, the above mentioned adaptive technique preferably responds to the traffic intensities at the source output port and the destination input port. In many instances, NULL creation is discouraged if there is any indication that either of these ports is becoming saturated with traffic. For that purpose, each set in stage 2k–i may transmit a "busy" message to the nodes in stage i, which may be stored in list 602 of FIG. 6. This information may be communicated from the nodes of the output stages to the nodes of the input stages by a bus or the like, such as by periodically transmitting a bitmap representation of whether the nodes of the output stages are currently busy or not busy.

Figure 11A:
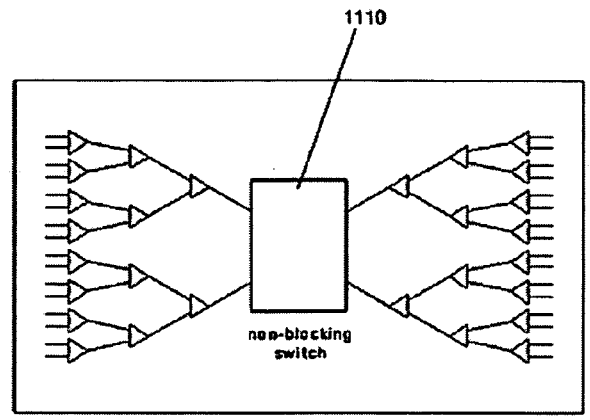
FIGS. 11(a) through 11(c) illustrate another example of the management of NULL cells in accordance with an aspect of the invention.
Figure 11B:
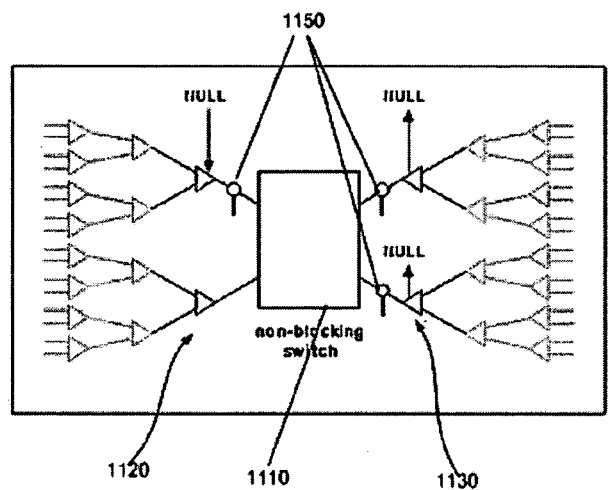
Figure 11C:
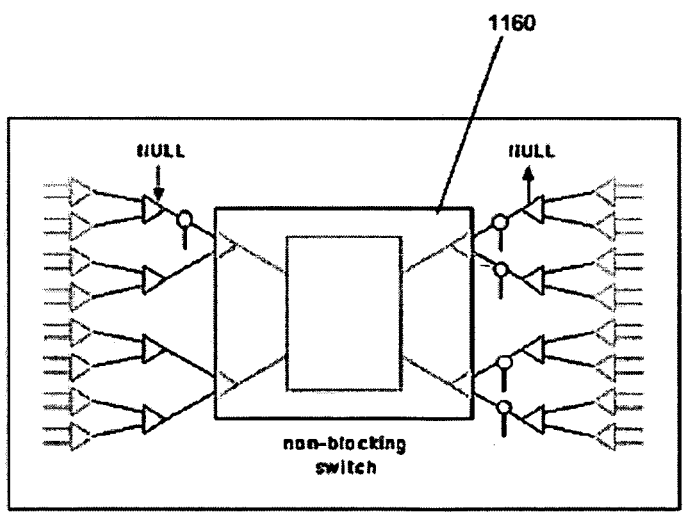

FIGS. 11(a) through 11(c) illustrate one manner in which the generation of NULL values is dependant on the amount of traffic entering the nodes in the output stages. Congestion tends to occur when the queues become too long, and NULLs tend to build up in the queues when they are generated at a rate where they exceed the capacity of the output stages.

The aspect of the invention shown in FIG. 11(a) addresses this problem by the use of a non-blocking switch at the center. The switch 1110 may be considered "non-blocking," and thus prevents congestion, if the volume of the input traffic directed towards any one output port of the switch 1110 does not exceed the capacity of that port.

FIG. 11(b) focuses on the three central stages of the network, that is the central non-blocking switch 1110 and the multiplexers 1120 and demultiplexers 1130 directly connected to it. If the output of the multiplexers does not exceed the input capacity of a demultiplexer, then the entire inner three-stage configuration will be non-blocking as well. As indicated previously, if it is necessary to insert NULLs in the multiplexer stage, then those NULLs will be removed as the traffic enters the mirror demultiplexer stage. However, the NULLs represent extra traffic load on the central switch. Accordingly, the creation and introduction of these NULLs into the non-blocking center stage may cause the center stage to lose its non-blocking criteria and cause congestion.

Therefore, to prevent the center stage from losing its non-blocking status, the traffic level entering and leaving the center stage switch is monitored (as illustrated by magnifying glasses 1150). If any of those connections is seen to become too busy, it may be necessary to curtail the insertion of NULLs. By curtailing the creation of NULLs a multiplexer may introduce delay for the traffic contained in an incomplete group but it does not lead to indefinitely long queues. When additional traffic arrives it is combined with the partially complete group and thereby causes the delayed traffic to move onward without the need for NULLs. Knowing that the center stage will not congest and the NULLs are discarded as they enter the demultiplexers, one can have confidence that there will be no congestion in this 3-stage sub-network; in this regard, the 3-stage sub-network retains its non-blocking property.

The reasoning above can be repeated for the larger sub-network illustrated in FIG. 11(c). Because the inner 3-stage sub-network 1160 (comprised of central non-blocking switch 1110, multiplexers 1120 and demultiplexers 1130) has properties of a single non-blocking switch, the other stages of the network can also use the same mechanisms to prevent congestion. In other words, it can be recursively shown that the entire network is rendered non-blocking if the creation of NULLs at each stage of switching is governed by the volume of traffic leaving the multiplexers of that stage and entering the demultiplexers of the corresponding output stage.

When a cell of a group enters an empty output queue 602 of a source node the current time is placed in time 612 in list 602. For this purpose time may conveniently be measured by the number of cycles that the control process makes through the lists of queues referred to by head 620 and 621 in output port descriptor 601. A count of these cycles may be conveniently recorded in a register CT. Another register, CW, governs when the constituent cells of a partially completed group have waited long enough so that the incomplete group should be transmitted. A queue is considered to contain a group ready for transmission if either the queue length 611 is equal to or greater than n, or time 612 is less than or equal to CT minus CW. It may also be advisable to refrain from adding NULLs to and transmitting an incomplete group when busy 608 indicates that there is congestion in the destination node.

Periodically the node updates register CW either by increasing its value or by reducing the value. An increase is typically appropriate at times of heavy traffic and a reduction is typically appropriate when there is diminished probability of congestion. CW may be increased by one each time that a cell is transmitted through any one of the node output ports, and CW is reinitialized to a constant value when the output port is idle. For example, that initial value might be n+1. Idle time arises when the output port is available to transmit a cell but there is no group waiting and ready for transmission.

The foregoing NULL management system and method may also use the assistance of cell headers. Cell headers may include both a TYPE field and a STAGE number. The TYPE may be used to distinguish NULL from ordinary cells, and STAGE may be used so that the nodes know which stage has the job of discarding a NULL. The stage number can either be the number of the source stage or the destination stage for the NULL.

Flexibility

At least one of the advantages of the present invention is its ability to be implemented by various embodiments in addition to those described above, and by its variety of applications.

For example, in one aspect, the invention provides a large-scale machine for switching a mixed load of voice, video and data traffic. In other aspects, the switch:
  a) provides switching for traffic carried on thousands of high speed transmission lines;
  b) avoids the need for excessively high speed interconnections within the switch;
  c) avoids the need for excessively high performance electronics in the nodes of the switch;
  d) spreads the traffic so that there are no hot spots that would block the passing traffic;
  e) retains proper sequence for each flow of data passing through the switch;
  f) avoids a central scheduler; and
  g) increases the predictability of the switch performance.

In another aspect, the present invention provides a switching network wherein the nodes of the network are individual cell switches with internal memory, and there is an interconnection network with multiple independent paths between any pair of ingress/egress ports.

In yet further aspects, the invention provides a method of routing cells, preferably of fixed sizes, where:
  Cells are grouped according to their input/output pairing, with as many cells in a group as there are independent paths for a given mux/demux port pair;
  Each cell of a group is simultaneously sent on a different one of the alternative independent paths;
  Decisions on forwarding cells are synchronized and made at each stage along the alternative paths so that cells of the group propagate through the network at the same rate; and
  The cells of a group arrive simultaneously at an egress port where they are transmitted through the egress port in proper sequence.

In yet additional aspects, the invention provides a method of routing cells, preferably of fixed sizes, where:

Cells are grouped according to their input/output port pairing, with as many cells in a group as there are independent paths for a given ingress/egress port pair;

Each cell of a group is simultaneously sent on a different one of the alternative independent paths;

Decisions on forwarding cells are synchronized and made at each stage along the alternative paths so that cells of the group propagate through the network at the same rate; and The cells of a group arrive simultaneously at an egress port where they are transmitted through the egress port in proper sequence.

In aspects, the switch is implemented with the use of non-rectangular networks such as triangular networks, and networks where there is concentration or expansion as one moves from stage to stage. Preferably, non-rectangular networks are symmetric with respect to the ingress and egress ports, that is, the center stage may contain more or less nodes than the other stages but an input stage will have the same number of nodes as its mirrored output stage.

Figure 7:
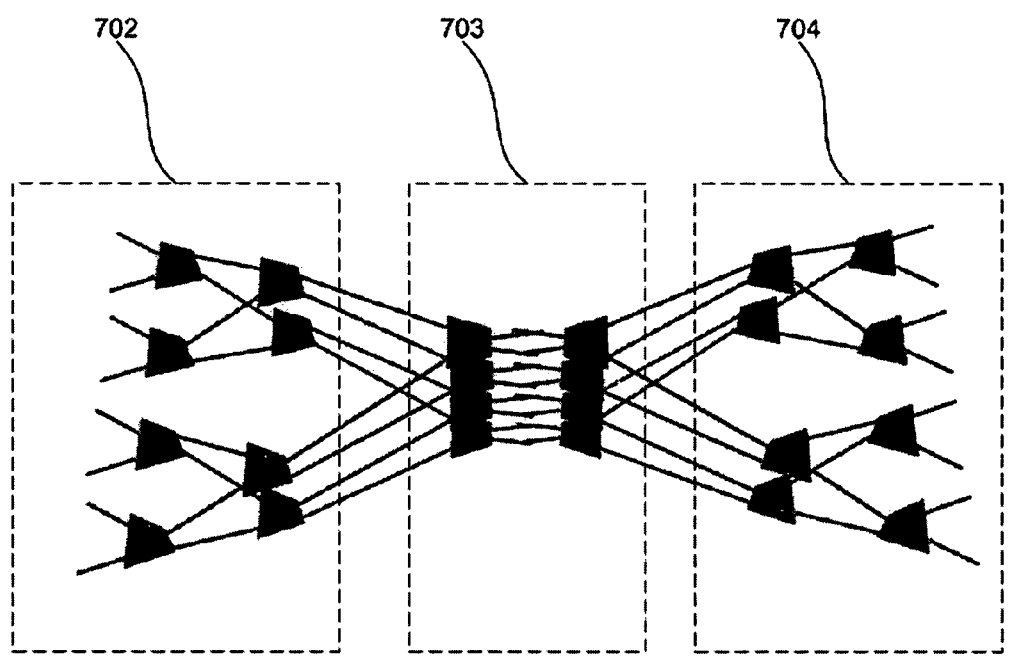
FIG. 7 illustrates a 3-dimensional model of a 5-stage switching network that may also be used in connection with the present invention.

FIG. 7 represents a 3-dimensional model of a 5-stage switching network that may also be used in connection with the present invention. The two input stages 702 each employ four nodes, each 2 by 2 node being represented by a tetrahedron. The two output stages 704 for this switching network also employ four 2 by 2 nodes. The center stage 703 switches, of which there are four mounted one above the other, comprise a pair of nodes configured as a multiplexer/demultiplexer pair. If viewed from above, this model would appear to have four input multiplexers feeding into two second stage multiplexers which then feed into a central switch. If viewed from the side it is apparent that the multiplexer outputs are in reality multiple wires which run parallel, one above the other in order to achieve the necessary transmission capacity. (If the nodes of this model were arranged on a flat table the configuration would resemble a Clos switching network but with its center stage switches each implemented as a two-node pair.)

The invention is further capable of taking advantage of larger traffic cross-sections in the center of the network.

In yet another aspect, the invention hierarchically forms groups as the traffic converges towards the center of the switch, such that groups assembled in stage i are based upon cells which have a particular set in stage $2k-i$ as a common intermediate destination.

In a further aspect, the packets of data are fragmented into cells, and the cells are then combined into larger groups of fixed sizes so as to take advantage of cells from multiple conversations. Thus, the group is not itself a single large cell, but rather a group of cells following parallel paths.

In still a further aspect, the switch coordinates traffic flow through the individual cells so that they may be easily reassembled. This aspect is furthered by one or more of the following: ordering the interconnections between nodes to preserve the cell sequence; the use of a single clock for each set (or stage); the use of a common clock to align the control processes; using control processes that can be completed in a single time slot; including the egress path address in a cell header; and using an algorithm which behaves identically in each node of a set.

In another aspect, the present invention enables construction of a low power high capacity switch capable of handling asymmetric traffic loads without substantial hotspots.

One aspect of the invention also permits the switching networks to be used as a single central switch.

In addition, an aspect of the invention comprises a switching network comprising:

Packet switches serving as nodes of the network;

Interconnections between the nodes to provide multiple independent paths between any pair of ingress/egress ports;

Transmitting packets in equal volume on independent paths;

Forwarding packets through the network so that they propagate at equal rate on each one of the independent paths and therefore arrive simultaneously at the egress port; and Merging the converging packet flows at the egress so that the original packet sequence is restored.

This invention further enables the construction of a large high capacity switch, which is particularly advantageous with respect to the provision of broadband communication on a massive scale. In one aspect, a large switch is constructed from a network of small switches, whereby bottlenecks that are commonly associated with large switches are minimized, even if traffic loads are asymmetric and unpredictable. The invention may also permit the processing of the traffic so that unpredictability is reduced, and aggregates traffic in a manner that leads to a more manageable flow that is consistent with typical high speed packet switching and queuing. The switch architecture may also employ broad-scale parallelism to obtain high performance consistent with the processed traffic flow.

In another aspect, the movement of groups through the switching network is organized so that the traffic is uniformly spread across the network, thereby minimizing the problem of switching networks which allow "hot-spots" to form when unexpected traffic patterns interact badly with the topology of the network. While topologically similar to multi-stage Clos networks (the Cartesian position of the nodes is typically different than that illustrated), the organization of the nodes into sets and the cells into traveling groups provides many advantages as discussed above. In this regard, the invention is also applicable to isomorphic transformations of a Clos network.

Unless stated to the contrary, use of words such as "including," "containing," "such as," "comprising" and the like, means "including without limitation" and shall not be construed to limit any general statement that it follows to the specific or similar items or matters immediately following it. References to a "plurality" of things means at least two of the things, and, unless stated to the contrary, reference to "a" or "one" thing does exclude the possibility of using a plurality of such things. The use of section headings is for general indexing purposes only and is not intended to limit the subject matter of the applicable section to a single topic.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

The invention claimed is:

1. A system comprising:
   ingress ports to receive values into the system;
   egress ports to transmit, from the system, the values received at the ingress ports;
   a plurality of nodes, each node comprising a plurality of input and output ports for accepting and transmitting values, respectively, and a switch for selecting an output port to output a value received on an input port;

each node being associated with an ingress stage, a center stage or an egress stage, where:
- every node in a stage is the same distance from the ingress ports as the other nodes in the stage,
- the input ports of the nodes in a stage receive values from either the output ports of another stage or the ingress ports,
- the output ports of the nodes in a stage transmit values to either the input ports of another stage or the egress ports,
- an ingress stage refers to those stages that are closer to the ingress ports than the egress ports,
- an egress stage refers to those stages that are closer to the egress ports than the ingress ports, and
- a center stage refers to the stage that is equidistant from the egress ports and the ingress ports;

each node being further associated with an ingress set, an egress set or a center set where:
- all of the nodes in a set are in the same stage,
- an ingress set refers to a set in an ingress stage,
- an egress set refers to a set in an egress stage,
- a center set refers to a set in the center stage,
- the number of nodes in an ingress set increases with the set's distance from the ingress ports, and
- the number of nodes in an egress set increases with the set's distance from the egress ports;

each of the nodes of an ingress set being configured such that information transmitted by the output ports of the set during a clock cycle is intended for the same egress set.

2. The system of claim 1 wherein the nodes of an ingress set transmit information intended for the same egress set having the same number of nodes as the ingress set.

3. The system of claim 1 wherein each of the nodes of the center set transmits information intended for the same egress set.

4. The system of claim 1 wherein egress sets do not receive information intended for other egress sets of the same size.

5. The system of claim 1 wherein the size of a set increases exponentially with distance from the closest ingress or egress port.

6. The system of claim 5 wherein the size of a set increases exponentially based on the number of inputs to the node and distance from the closest ingress or egress port.

7. The system of claim 1 wherein a node of ingress set queues information received on the node's input ports until all of the nodes of the set store information intended for the same egress set.

8. The system of claim 1 wherein the number of nodes in each stage is the same.

9. The system of claim 1 wherein the number of nodes in some stages is larger than the number of nodes in other stages.

10. The system of claim 1 wherein the nodes are packet switches.

11. The system of claim 1 comprising a high capacity switch for broadband transmissions.

12. The system of claim 1 wherein at least one set contains at least three nodes.

13. A method of routing cells of information through from ingress ports of a switch to egress ports of the switch, the switch being comprised of 2k−1 stages of interconnected nodes wherein at least one stage is an ingress stage such that the nodes of the ingress stage receive cells from ingress ports, wherein at least one stage is an egress stage such that the nodes of the egress stage transmit cells to the egress ports, and wherein at least one stage is the center stage where k is the stage number of the center stage relative to the ingress stage (k being an integer), the method comprising:
- receiving cells at the ingress ports, the cells having egress ports as a destination;
- transmitting the cells towards the center stage of the switch in groups, whereby groups of cells transmitted from a set of nodes in stage i are grouped based upon cells which have a particular set of nodes in stage 2k−i as a common intermediate destination within the switch (i being an integer); and
- transmitting the cells out of egress ports.

14. The method of claim 13 further comprising deferring transmission of cells out of a set until all of the nodes of the set have cells having the same particular set of nodes as a common intermediate destination.

15. The method of claim 13 further comprising disassembling the groups after the cells pass the center stage.

16. The method of claim 15 wherein each stage after the center stage further disassembles the groups.

17. The method of claim 15 wherein each cell of a group comprises information unrelated to another cell of the group.

18. A cell switching system comprising (where m and n are integers)
- a first stage comprising m n-to-one multiplexers that transmit information to a second stage;
- each multiplexer configured so as to form groups of cells of size n and transmit group members substantially simultaneously;
- said second stage comprising a set of n m-by-m switches that feed into a third stage; and
- said third stage comprising m one-to-n demultiplexers;
- wherein one cell goes to each switch of the second stage and all members of a group are destined for one of the demultiplexers in the third stage;
- wherein the second stage of the cell system comprises:
- a second first stage comprising m n-to-one multiplexers that transmit information to a second stage;
- each multiplexer of the second first stage configured so as to form groups of cells of size n and transmit group members substantially simultaneously;
- a second second stage comprising a set of n m-by-m switches that feed into a second third stage; and
- a second third stage comprising m one-to-n demultiplexers.

19. A system of claim 18 wherein the second second stage of the cell system comprises:
- a third first stage comprising m n-to-one multiplexers that transmit information to a second stage;
- each multiplexer of the third first stage configured so as to form groups of cells of size n and transmit group members substantially simultaneously;
- a third second stage comprising a set of n m-by-m switches that feed into a third third stage; and
- a third third stage comprising m one-to-n demultiplexers.

20. The system of claim 18 wherein the second second stage comprises a set of n individual switch nodes.

21. The system of claim 18 wherein the system further comprises a network of nodes and wherein all n cells of a group entering the second second stage are handled identically by the nodes such that the group of cells emerge from the second second stage at the same time and arrive simultaneously at the same third stage demultiplexer.

22. The system of claim 18 wherein all cells within a group formed by a multiplexer in the first stage arrive simultaneously at a destination demultiplexer of the third stage.

23. The system of claim 18 wherein the demultiplexers enqueue the cells of an incoming group so as to preserve the sequential order in which the cells were input into the multiplexer that formed the group.

24. The system of claim 18 wherein: the system comprises a switch having N ingress ports and N egress ports where N is the product of n and m; the N ingress ports correspond to the n input ports on the m multiplexers of the first stage, and; the N egress ports correspond to the n output ports of the m demultiplexers of the third stage.

25. The system of claim 24 wherein the cells comprise a header representing the intended egress port of the cell.

26. The system of claim 25 wherein cells arrive at the egress port in the same sequence in which they arrived at the ingress port.

27. A switching system comprising:
a plurality of ingress ports through which packets enter the system,
a plurality of egress ports through which packets leave the system, and
a plurality of stages each of which comprises a set of switches,
each set comprising a plurality of input ports to accept packets from either another stage or the ingress ports,
each set further comprising a plurality of output ports to transmit packets to either another stage or the egress ports,
a plurality of the sets being configured to form, after arrival of packets at the set, a group containing s packets (s being an integer), and to transmit the group through s output ports during a single clock cycle.

28. The system of claim 27 wherein different nodes have different values for s.

29. The system of claim 28 wherein the nodes of the same stage have the same value for s.

* * * * *